United States Patent
Kostrzewa et al.

(10) Patent No.: US 10,986,288 B2
(45) Date of Patent: Apr. 20, 2021

(54) FLAT FIELD CORRECTION SYSTEMS AND METHODS FOR INFRARED CAMERAS

(71) Applicant: FLIR Systems, Inc., Wilsonville, OR (US)

(72) Inventors: Joseph Kostrzewa, Santa Ynez, CA (US); Jason Gardner, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/735,964

(22) Filed: Jan. 7, 2020

(65) Prior Publication Data

US 2020/0154063 A1    May 14, 2020

Related U.S. Application Data

(63) Continuation of application No. PCT/US2018/043958, filed on Jul. 26, 2018.

(60) Provisional application No. 62/537,648, filed on Jul. 27, 2017.

(51) Int. Cl.
*H04N 5/33* (2006.01)
*H04N 17/00* (2006.01)

(52) U.S. Cl.
CPC ............. *H04N 5/33* (2013.01); *H04N 17/002* (2013.01)

(58) Field of Classification Search
CPC .............................. H04N 5/33; H04N 17/002
See application file for complete search history.

(56) References Cited

U.S. PATENT DOCUMENTS

| | | | |
|---|---|---|---|
| 8,373,757 B1 * | 2/2013 | Nguyen | H04N 17/002 348/164 |
| 8,378,290 B1 | 2/2013 | Speake et al. | |
| 9,143,709 B1 * | 9/2015 | Winn | H04N 5/3651 |
| 2008/0302956 A1 | 12/2008 | Anderson | |
| 2009/0272888 A1 | 11/2009 | Nugent et al. | |
| 2013/0147966 A1 | 6/2013 | Kostrzewa et al. | |

* cited by examiner

*Primary Examiner* — Michael E Teitelbaum
(74) *Attorney, Agent, or Firm* — Haynes and Boone, LLP

(57) ABSTRACT

Various techniques are provided to perform flat field correction (FFC) for infrared cameras. In one example, a system includes a focal plane array (FPA) of an infrared camera configured to capture thermal image data in response to infrared radiation received by the FPA via an optical path of the infrared camera. The system further includes a memory configured to store a set of supplemental FFC values. The system further includes a processor configured to determine a scale factor based at least on a temperature and/or a rate of temperature change of an internal component of the infrared camera; generate a scaled set of supplemental FFC values based on the scale factor and set of supplemental FFC values; and apply the scaled set of supplemental FFC values to the thermal image data to adjust for non-uniformities associated with at least a portion of the first optical path.

20 Claims, 8 Drawing Sheets

FLAT FIELD CORRECTION SYSTEMS AND METHODS FOR INFRARED CAMERAS

CROSS-REFERENCE TO RELATED APPLICATIONS

This application is a continuation of International Patent Application No. PCT/US2018/043958 filed Jul. 26, 2018 and entitled "FLAT FIELD CORRECTION SYSTEMS AND METHODS FOR INFRARED CAMERAS," which is incorporated herein by reference in its entirety International Patent Application No. PCT/US2018/043958 filed Jul. 26, 2018 claims priority to and the benefit of U.S. Provisional Patent Application No. 62/537,648 filed Jul. 27, 2017 and entitled "FLAT FIELD CORRECTION SYSTEMS AND METHODS FOR INFRARED CAMERAS," which is hereby incorporated by reference in its entirety.

TECHNICAL FIELD

The present disclosure relates generally to thermal imaging systems and, more particularly, to systems and methods for calibrating thermal imaging devices, such as focal plane arrays.

BACKGROUND

Focal plane arrays (FPAs) which detect infrared radiation are well known in the art and are used by infrared cameras to provide thermal images. For example, infrared radiation passing through an optical path of the infrared camera is received by infrared detectors of the FPA, which provide thermal image data for pixels of a two-dimensional image.

The quality of thermal images provided by FPAs may be degraded due to non-uniform responses among the individual infrared detectors to incident infrared radiation. Factors contributing to the performance degradation may include, for example, variations in the physical characteristics (i.e., dimensions and locations), infrared radiation absorption coefficient, resistance, temperature coefficient of resistance (TCR), heat capacity, and/or thermal conductivity of the individual infrared detectors. FPA performance may also be degraded by non-uniform out-of-field infrared radiation from surrounding mechanical components. Because the magnitude of the non-uniformity may be large in comparison to the magnitude of the actual response due to the incident infrared radiation, various techniques are typically used to compensate for the non-uniformity and obtain a desirable signal-to-noise ratio.

For example, the FPA may be calibrated over one or more levels of photon flux by inserting a shutter (i.e., an optical obscuration also referred to as a calibration flag) into the optical path of the infrared camera. The temperature of the shutter may be adjusted to emulate a thermal black body detected by the FPA. The FPA takes one or more data frames or snapshots of the shutter to calibrate its response, and the collected data may then be used to calibrate the FPA to provide a more uniform response. The shutter location is often chosen to be as close as possible to the FPA (i.e., between the FPA and the lens) to reduce the shutter size and thus provide a more compact infrared camera.

Although the above-described shutter calibration technique permits calibration of the FPA for the portion of the optical path between the shutter and the FPA, it does not calibrate the FPA to correct for the thermal non-uniformity of the shutter's paddle and the out-of-field infrared radiation caused by other portions of the optical path including, for example, lenses, windows, mounting hardware, or other components of the infrared camera which may be implemented in front of the shutter (i.e., not between the shutter and the FPA). Such non-uniformities may further degrade FPA performance by radiometrically distorting the thermal image data detected by the FPA. Accordingly, there is a need for an improved approach to the calibration of an FPA within an infrared camera.

SUMMARY

One or more embodiments may be used to provide flat field correction (FFC) for infrared cameras. For example, infrared detectors of an infrared camera may be calibrated to determine FFC values, which may be used to correct for non-uniformities associated with optical paths of the infrared camera. Supplemental flat field correction (SFFC or supplemental FFC) values may also be determined and applied to thermal image data to further correct for such non-uniformities. In some aspects, a scale factor may be applied to the supplemental FFC values to adjust the supplemental FFC values based on a temperature and/or rate of temperature change of the infrared camera and/or components thereof (e.g., focal plane arrays, lenses, housing, etc.). A different scale factor may be applied at different instances in time. For instance, the scale factor that is applied may be adjusted in real time or near real time in response to changes in the temperature and/or rate of temperature change (e.g., as measured by one or more temperature sensors).

In one embodiment, a system includes an FPA of an infrared camera configured to capture thermal image data in response to infrared radiation received by the FPA via a first optical path of the infrared camera. The system further includes a memory configured to store a set of SFFC values. The system further includes a processor configured to determine a temperature of an internal component of the infrared camera. The processor is further configured to determine a scale factor based at least on the temperature and/or a rate of temperature change of the internal component. The processor is further configured to generate a scaled set of SFFC values based at least on the scale factor and the set of SFFC values. The processor is further configured to apply the scaled set of SFFC values to the thermal image data to adjust for non-uniformities associated with at least a portion of the first optical path.

In another embodiment, a method includes capturing thermal image data at an FPA of an infrared camera via an optical path of the infrared camera. The method further includes determining a temperature of an internal component of the infrared camera. The method further includes determining a scale factor based at least on the temperature and/or the rate of temperature change of the internal component. The method further includes generating a first scaled set of SFFC values based at least on the first scale factor and a set of SFFC values. The method further includes applying the first scaled set of SFFC values to the thermal image data to adjust for non-uniformities associated with at least a portion of the optical path.

In another embodiment, a non-transitory machine readable storage medium includes machine readable instructions which, when executed, cause one or more processors of a device to perform operations including determining a temperature of an internal component of an infrared camera. The operations further include determining a scale factor based at least on the temperature and a rate of temperature change of the internal component. The operations further include generating a scaled set of SFFC values based at least on the scale factor and a set of calibrated SFFC values. The operations further include applying the scaled set of SFFC values to thermal image data captured by a focal plane array (FPA) of the infrared camera to adjust for non-uniformities associated with at least a portion of an optical path of the infrared camera.

The scope of the present disclosure is defined by the claims. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
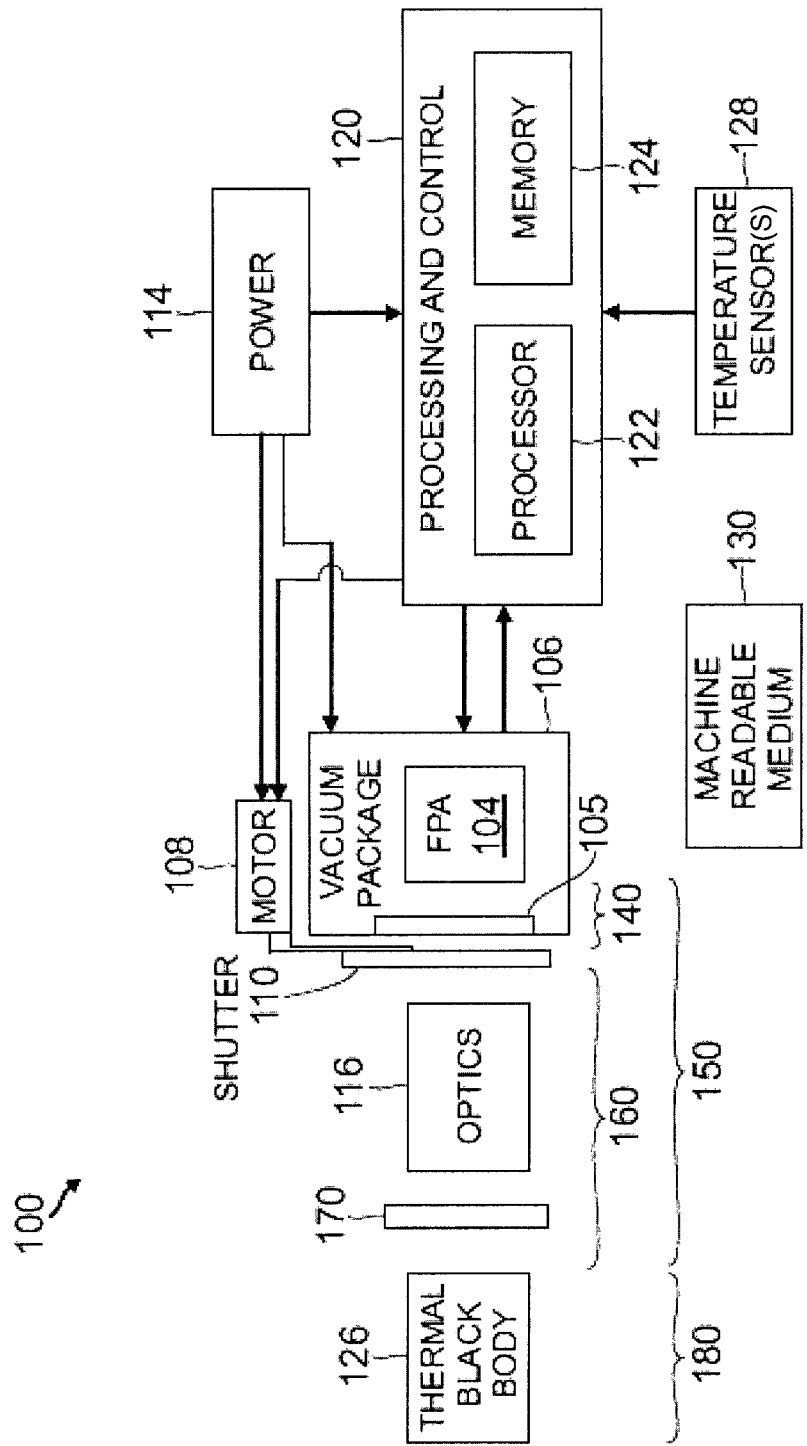
FIG. 1 illustrates an infrared camera in accordance with an embodiment of the present disclosure.

FIG. 1 illustrates an infrared camera 100 in accordance with an embodiment of the present disclosure. Infrared camera 100 includes an infrared detector package 106, a motor 108, a shutter 110, a power block 114, an optics block 116, a processing and control block 120, a temperature sensor(s) 128, and an optional window 170.

In one example, infrared camera 100 may represent any type of infrared camera or thermal imaging system, is not limited to any specific embodiment disclosed herein, and may be implemented as desired for particular applications. Accordingly, in one embodiment, the components illustrated in FIG. 1 may be implemented as a standalone infrared camera. In another embodiment, the components of FIG. 1 may be distributed between a plurality of different devices. For example, processing and control block 120 may be implemented by one or more external computer systems that interface with infrared camera 100 (e.g., over a network or other appropriate communication medium). In another embodiment, infrared camera 100 may be implemented with greater, fewer, and/or different components than those illustrated in FIG. 1 as appropriate for particular applications.

Infrared energy received from a scene 180 in front of infrared camera 100 passes along an optical path 150 through optics block 116 (e.g., optics including one or more elements for focusing infrared radiation on infrared detector package 106) to infrared detector package 106 (e.g., a vacuum package assembly). In one embodiment, infrared detector package 106 and optics block 116 may be sealed inside a chamber (not shown) including window 170 (e.g., a heated or temperature controlled protective window) positioned between optics block 116 and scene 180.

In another embodiment, one or more elements (e.g., lenses, mirrors, and/or other components) of optics block 116 may be selectively inserted into optical path 150. Accordingly, infrared camera 100 may be operated with various focal lengths (e.g., 25 mm, 35 mm, 50 mm, 140 mm, or others) as may be desired for particular applications. The different types of optical configurations (e.g., elements, arrangements of elements, focal length of elements, etc.) may contribute to different non-uniformities in the propagation of infrared radiation along optical path 150.

Infrared detector package 106 includes a focal plane array (FPA) 104 to detect infrared radiation passing through a window 105 (e.g., vacuum-package window) and provide thermal image data in response thereto. FPA 104 may be implemented using various types of infrared detectors (e.g., quantum wells, microbolometers, or other types) as may be desired for particular implementations.

In order to calibrate FPA 104, a thermal black body 126 may be positioned in scene 180 such that thermal black body 126 fully subtends the lens field of view (FOV) of infrared camera 100. By operating infrared camera 100 in a thermally stable environment (e.g., corresponding to a thermal steady state condition such as room temperature) and capturing thermal images of thermal black body 126, FFC values may be determined which may be applied to thermal image data received from FPA 104 to correct for non-uniformities (e.g., thermal loading or optical irregularities) present in optical path 150.

In some cases, steady state condition may be reached after infrared camera 100 has been powered on for a period of time, such as two minutes, three minutes, ten minutes, etc. In this regard, for example, a steady state temperature of a component may refer to a temperature at which the component does not exhibit any further self-heating or exhibits negligible further self-heating. Different components of infrared camera 100 may be associated with different steady state temperatures. Infrared camera 100 with higher thermal mass (e.g., infrared camera 100 with larger elements such as larger lenses) may be associated with different steady state temperatures of the various components (e.g., lower average steady state temperatures). In some cases, in a power toggle situation in which infrared camera 100 is turned off and turned back on soon thereafter, infrared camera 100 can reach (e.g., return to) its associated steady state temperature(s) faster than in a case that infrared camera 100 was turned off for a relatively long period of time (e.g., twenty minutes, an hour, or other amount of time to allow sufficient cooling of infrared camera 100) and then turned back on.

Shutter 110 may be selectively inserted into optical path 150 through the operation of motor 108 to facilitate calibration of FPA 104. For example, in the embodiment illustrated in FIG. 1, shutter 110 is shown inserted into optical path 150. While inserted into optical path 150, shutter 110 substantially blocks infrared radiation from passing to FPA 104 from scene 180. In this case, FPA 104 instead detects infrared radiation received from shutter 110 along an optical path 140, to the exclusion of infrared radiation received along an optical path 160. In one embodiment, shutter 110 may be implemented to approximate a thermal black body in front of infrared detector package 106. By calibrating FPA 104 to shutter 110, flat field correction values may be determined which may be applied to infrared detectors of FPA 104 in order to correct for non-uniformities present in optical path 140, as discussed further herein, and also to correct for non-uniformities in the infrared detectors of FPA 104 itself.

Power block 114 may include a circuit board power subsystem (e.g., a power board) for infrared camera 100. For example, power block 114 may provide various power conversion operations and desired power supply voltages, power on-off switching (e.g., also referred to as turn on-off switching), and various other operations (e.g., a shutter driver for motor 108), including an interface to a battery or external power supply, as would be understood by one skilled in the art.

Processing and control block 120 includes a processor 122 and a memory 124. Processor 122 may be configured with appropriate software (e.g., one or more computer programs for execution by processor 122) stored on a machine readable medium 130 (e.g., a CD-ROM or other appropriate medium) and/or in memory 124 to instruct processor 122 to perform one or more of the operations described herein. Processor 122 and memory 124 may be implemented in accordance with any desired combination of one or more processors and/or one or more memories as desired for particular implementations.

Processing and control block 120 receives thermal image data captured by infrared detectors of FPA 104 and processes the thermal image data to perform a flat field correction on the data to account for non-uniformities associated with the infrared detectors of FPA 104 and other non-uniformities associated with other portions of optical path 150 (e.g., non-uniformities associated with optics block 116 and/or other portions of infrared camera 100). The corrected thermal image data may be used to provide corrected thermal images which account for aberrations in optical path 150.

Processing and control block 120 also interfaces with motor 108 to control the insertion and removal of shutter 110 from optical path 150. Advantageously, processing and control block 120 may receive thermal image data captured by FPA 104 either while shutter 110 is inserted into optical path 150 or while shutter 110 is removed from optical path 150. As a result, processing and control block 120 may selectively calibrate FPA 104 along either optical path 140 (e.g., while shutter 110 is inserted in optical path 150) or optical path 150 (e.g., while shutter 110 is removed from optical path 150). For example, in one embodiment, processing and control block 120 may determine flat field correction values (e.g., gain and offset values) associated with individual infrared detectors of FPA 104 to correct for non-uniformities associated with the infrared detectors for either optical path 140 or optical path 150. As further described herein, the flat field correction values may be further processed to determine supplemental FFC values to correct for non-uniformities associated with optical path 160.

Processing and control block 120 also interfaces with temperature sensor(s) 128 to determine a temperature and a rate of temperature change of the ambient environment in which infrared camera 100 is positioned and/or one or more components of infrared camera 100 (e.g., FPA 104, infrared detector package 106, motor 108, shutter 110, power block 114, optics block 116, processing and control block 120, window 170, and/or other components). Processing and control block 120 may be configured to scale the supplemental FFC values based on temperature readings obtained from temperature sensor(s) 128.

Temperature sensor(s) 128 may be positioned in any desired location of infrared camera 100 (e.g., optics block 116, FPA 104, mechanical components near optical path 150 such as shutter 110 and/or window 170, and/or other locations of infrared camera 100) and/or in the ambient environment in which infrared camera 100 is positioned. For example, in one embodiment, one or more of temperature sensor(s) 128 is positioned on FPA 104, window 105, window 170, and/or shutter 110 (e.g., shutter paddle). In this regard, temperature sensor(s) 128 may be positioned to appropriately measure and provide temperature readings of various internal components of infrared camera 100, components external to and/or externally coupled to infrared camera 100, ambient environment, and so forth.

Figure 2:
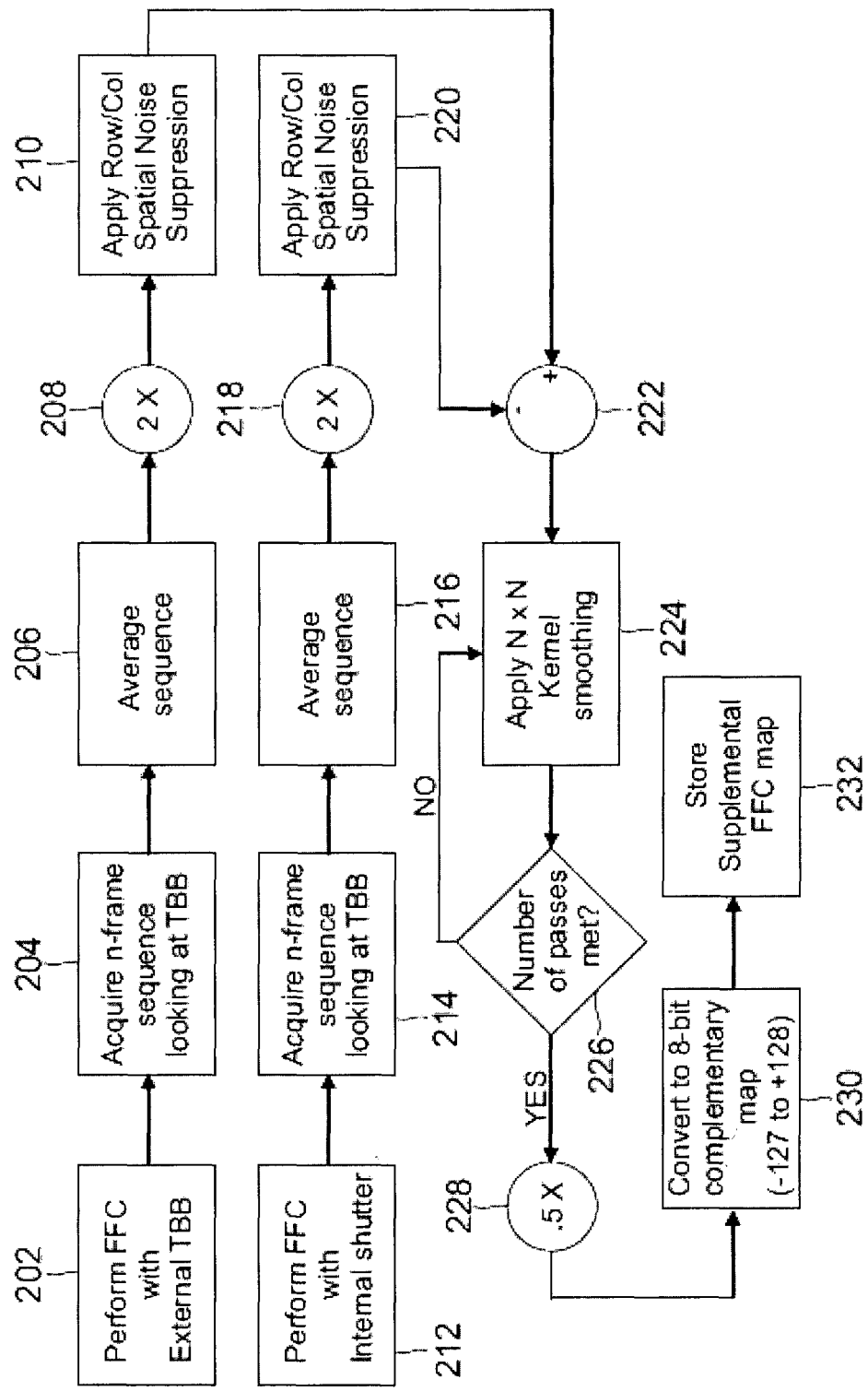
FIG. 2 illustrates a process of determining supplemental flat field correction values in accordance with an embodiment of the present disclosure.

FIG. 2 illustrates a process of determining supplemental FFC values in accordance with an embodiment of the present disclosure. In one example, the process of FIG. 2 may be performed by a provider or user of infrared camera 100 (e.g., a manufacturer, designer, or other party utilizing infrared camera 100). In this example, supplemental FFC values may be prepared by the provider and stored by infrared camera 100 to be subsequently used during operation of infrared camera 100 by a user. In another example, the process of FIG. 2 may be performed by a user of infrared camera 100. In yet another example, performance of the process of FIG. 2 may be distributed between a provider of infrared camera 100 and a user of infrared camera 100.

In steps 202 through 210, flat field correction values are determined for the infrared detectors of FPA 104 to correct for non-uniformities in optical path 150. In steps 212 through 220, flat field correction values are determined for the infrared detectors of FPA 104 to correct for non-uniformities in optical path 140. In steps 222 through 232, the flat field correction values associated with optical path 140 are subtracted from those associated with optical path 150 and the resulting supplemental FFC values are further processed. These supplemental FFC values may be applied to thermal image data obtained during subsequent operation of infrared camera 100.

Advantageously, the supplemental FFC values may be used to correct for non-uniformities associated with optical path 160 (e.g., the portion of optical path 150 external to shutter 110 and infrared detector package 106) that would not otherwise be correctable using only flat field correction values associated with optical path 140. Such non-uniformities may be attributable to, for example, window 170, optics block 116, mounting hardware of infrared camera 100, or other components of infrared camera 100. Also, the use of supplemental FFC values may reduce the effects of imperfections in window 105 (e.g., scratches and/or digs), FPA 104 (e.g., imperfections in window 105 (e.g., vacuum-package window)), or shutter 110 (e.g., imperfections in the thermal black body presented by shutter 110 to FPA 104 (e.g., due to non-uniform temperature or heating of shutter 110)).

In one embodiment, the process of FIG. 2 may be performed while infrared camera 100 and the surrounding ambient environment are under thermally stable conditions at room temperature (e.g., in a temperature-controlled chamber) while infrared camera 100 is in a final configuration to be used for capturing thermal image data during normal operation of infrared camera 100. For example, in this embodiment, all mechanical and thermal components of infrared camera 100 (e.g., elements of optics block 116, mounting hardware, and other components of infrared camera 100) may be mounted and powered on until temperature sensor(s) 128 indicates insignificant changes in temperature before the process of FIG. 2 is performed.

In another embodiment, the process of FIG. 2 may be repeated for different temperatures of the surrounding ambient environment and/or components of infrared camera 100. As a result, different supplemental FFC values may be determined for different temperatures.

In another embodiment, the process of FIG. 2 may be repeated for different configurations of infrared camera 100. For example, in different iterations of the process of FIG. 2, infrared camera 100 may be powered on and configured for capturing thermal images with different elements in optics block 116 (e.g., different sizes of lenses or lenses provided by different manufacturers), different mounting hardware, and/or other components. As a result, different supplemental FFC values may be determined for different configurations of infrared camera 100, or different types of infrared cameras 100.

Calculations described herein with regard to the process of FIG. 2 may be performed in a localized or distributed manner as may be desired in particular applications. For example, in one embodiment, the calculations may be performed locally by infrared camera 100 (e.g., where processing and control block 120 is implemented as part of infrared camera 100). In another embodiment, the calculations may be performed by one or more external computer systems that interface with infrared camera 100 (e.g., where processing and control block 120 is implemented by such computer systems). In yet another embodiment, the calculations may be performed locally by infrared camera 100 and one or more external computer systems that interface with infrared camera 100 (e.g., where processing and control block 120 is implemented as part of infrared camera 100 and is also implemented by such computer systems).

Referring now to the particular steps in the process of FIG. 2, in step 202, infrared camera 100 begins performing a flat field correction (FFC) process for FPA 104 while imaging thermal black body (TBB) 126 which is external to infrared camera 100. Accordingly, during step 202, processing and control block 120 controls motor 108 to remove shutter 110 from optical path 150.

In step 204, FPA 104 captures (e.g., acquires) two or more frames of thermal image data corresponding to infrared radiation received along optical path 150. For example, in one embodiment, FPA 104 captures eight frames of thermal image data which is passed to processing and control block 120.

In step 206, processing and control block 120 averages the thermal image data over the two or more frames received from FPA 104 to average out differences in the captured image values from frame to frame (e.g. due to noise variation). In one embodiment, the value of each pixel is averaged for all values of the same pixel in the frame sequence captured in previous step 204. For example, if eight frames of thermal image data are captured in previous step 204, then the average value of each pixel is determined based on the eight values for the pixel captured in the eight frames of thermal image data.

Also in step 206, when determining the average value of each pixel, processing and control block 120 may choose to ignore one or more pixel values from one or more frames that fall outside a selected range when compared to the same pixels of the other captured frames. For example, if eight frames are captured in step 204, and if a particular pixel of one of the frames has a value that significantly differs from values associated with corresponding pixels of the remaining seven frames, then the pixel value of the one frame may skew the average pixel value determined for the eight frames. Accordingly, processing and control block 120 may choose to ignore the pixel value of the one frame and instead determine an average pixel value over the remaining seven frames. As a result, the accuracy of the thermal image data provided in step 206 can be improved.

In optional step 208, the pixel values are multiplied by a factor of two for convenient computation by processing and control block 120. In optional step 210, processing and control block 120 applies row and column spatial noise suppression to the multiplied average pixel values based on conventional processing techniques as would be understood by one skilled in the art.

Following the completion of step 210, flat field correction values will have been determined for all infrared detectors of FPA 104. In this embodiment, any infrared radiation detected by FPA during steps 202 to 210 includes non-uniformities associated with infrared detectors of FPA 104, optics block 116, or other components of infrared camera 100 which may contribute infrared radiation along optical path 150. Accordingly, differences in thermal data obtained during steps 202 to 210 correspond to the composite effect of all non-uniformities along optical path 150. Processing and control block 120 uses these data values to determine a flat field correction value for each pixel that results in a thermally calibrated data value for the pixel when the flat field correction value is applied to a thermal image captured along optical path 150 while thermal black body 126 is in place and shutter 110 is removed from optical path 150 (e.g., for a given calibrated temperature).

In step 212, infrared camera 100 begins performing a flat field correction of FPA 104 while imaging shutter 110 which is internal to infrared camera 100. Accordingly, during step 212, processing and control block 120 controls motor 108 to insert shutter 110 into optical path 150. As a result, FPA 104 is configured to receive infrared radiation along only optical path 140 (i.e., not the entire optical path 150).

Steps 214 through 220 are performed for optical path 140 in substantially the same manner as described above for steps 204 through 210 for optical path 150. Accordingly, following the completion of step 220, another set of flat field correction values will have been determined for all infrared detectors of FPA 104. In this embodiment, any infrared radiation detected by FPA during steps 212 to 220 includes non-uniformities associated with shutter 110, infrared detectors of FPA 104, and/or other components of infrared camera 100 which may contribute infrared radiation along optical path 140. Accordingly, any differences in thermal data obtained during steps 212 to 220 correspond to the composite effect of all non-uniformities along optical path 140. Processing and control block 120 uses these data values to determine a flat field correction value for each pixel that results in a thermally calibrated data value for the pixel when the flat field correction value is applied to a thermal image captured along optical path 140 while shutter 110 is inserted into optical path 150.

In step 222, processing and control block 120 subtracts flat field correction values associated with optical path 140 from those associated with optical path 150 to obtain a supplemental FFC value for each pixel (i.e., infrared detector) of FPA 104.

In steps 224 through 232, processing and control block 120 further processes the supplemental FFC values. For example, in step 224, processing and control block 120 applies kernel smoothing to the supplemental FFC values to minimize high-frequency noise in the previously acquired image data. The kernel smoothing of step 224 may be applied using any desired density (e.g., 3 by 3 pixels or other densities). This kernel smoothing may be repeated any desired number of times (step 226). In one embodiment, step 224 may be performed using conventional techniques as would be understood by one skilled in the art.

In one embodiment, processing and control block 120 may be configured to generate only positive supplemental FFC values by adding an offset value (e.g., a predetermined offset value). For example, if a processor applying the supplemental FFC values does not perform (e.g., is incapable of performing or inefficient at performing) signed arithmetic, processing and control block 120 may generate only positive supplemental FFC values to facilitate applying of the supplemental FFC correction values by such a processor.

Although steps 224 and 226 have been described with regard to kernel smoothing techniques, other techniques may be used to smooth or otherwise reduce the differences between individual pixel values of the supplemental FFC values. Such techniques may include, for example, high frequency noise suppression techniques, pixel value blurring techniques, and/or other appropriate techniques as will be appreciated by one skilled in the art.

In optional step 228, processing and control block 120 divides the supplemental FFC values by a factor of two (e.g., if optional steps 208 and 218 were previously performed).

In optional step 230, processing and control block 120 scales the supplemental FFC values to an n bit resolution corresponding to a range from $-2^{n-1}+1$ to $+2^{n-1}$ (e.g., using n−1 data bits and one sign bit). For example, in an application, n may be 8 to provide an eight bit resolution corresponding to a range from −127 to 128. For this example application, an eight bit resolution may permit efficient usage of memory 124 during the processing of the supplemental FFC values while still providing sufficient resolution to adjust for non-uniformities present in thermal image data. As another example, n may be less than 8 or greater than 8 (e.g., n may be 16 to provide a sixteen bit resolution corresponding to a range from −32767 to 32768).

In one embodiment, the flat field correction values associated with optical paths 140 and 150 determined in steps 202 to 220, as well as the supplemental FFC values determined in step 222, may have a fourteen bit resolution (e.g., corresponding to the resolution of individual infrared detectors of FPA 104). In this embodiment, when n=8, the supplemental FFC values are scaled to a resolution of eight bits in step 230 as would be understood by one skilled in the art. In other embodiments, such as where larger adjustments are desired, higher bit resolutions may be used for the supplemental FFC values.

In step 232, the smoothed, scaled supplemental FFC values are stored as a supplemental FFC map which may be applied to thermal image data obtained during subsequent operation of infrared camera 100 to adjust for non-uniformities in optical path 160 (e.g., corresponding to the difference between optical path 150 and optical path 140).

Figure 3:
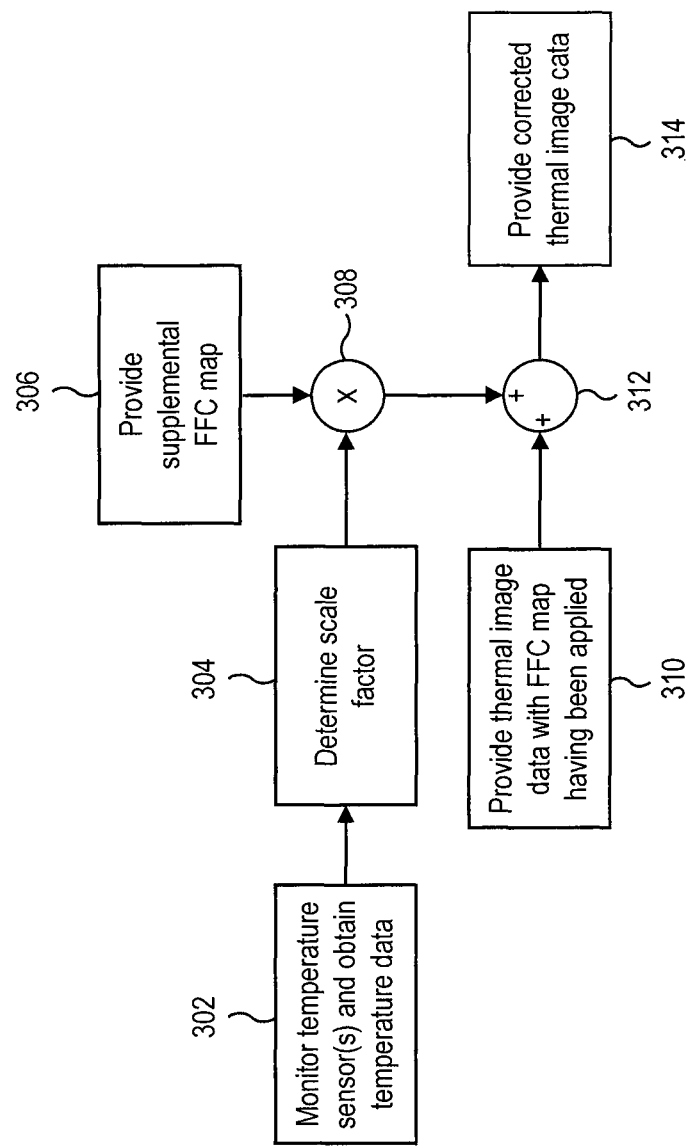
FIG. 3 illustrates a process of performing flat field correction in accordance with an embodiment of the present disclosure.

FIG. 3 illustrates a process of performing flat field correction in accordance with an embodiment of the present disclosure. For example, in one embodiment, the process of FIG. 3 may be performed by processing and control block 120 following the process of FIG. 2.

In step 302, processing and control block 120 monitors temperature sensor(s) 128 and obtains temperature data for the components of infrared camera 100 and/or the ambient environment in which infrared camera 100 is positioned. For example, in one embodiment, the temperature data (e.g., rate of temperature change, absolute temperature, etc.) may be integrated over a period of time to smooth out high frequency noise. In step 304, processing and control block 120 determines a scale factor based on the temperature data from the temperature sensor(s) 128. In some aspects, the scale factor may be determined based on a temperature rate of change of one or more components, absolute temperature of one or more components, differences in temperature data between the temperature sensor(s) 128 (e.g., differences in temperature rate of change of different components, differences in absolute temperature of different components, etc.). The scale factor may be used to adjust the amount of supplemental FFC applied to thermal image data in real time during operation of infrared camera 100.

In step 306, appropriate supplemental FFC values are provided from memory 124. The supplemental FFC values may be provided as a supplemental FFC map. In one embodiment, the supplemental FFC values provided in step 306 are selected from a plurality of different sets of supplemental FFC values corresponding to different configurations of infrared camera 100. For example, as previously described, the process of FIG. 2 may be repeated for different infrared cameras 100 or different configurations of infrared camera 100 to store different sets of supplemental FFC values corresponding to various configurations of optics block 116, mounting hardware, and/or other components of infrared camera 100. Accordingly, in step 306, the supplemental FFC values corresponding to the current infrared camera 100 or current configuration of infrared camera 100 are selected.

In step 308, the supplemental FFC values (e.g., provided from memory 124 in step 306) are scaled (e.g., multiplied) by the scale factor determined in step 304 to obtain scaled supplemental FFC values. For example, if the scaling factor determined in step 304 has a value of 60%, then each value in the supplemental FFC map (provided from memory 124 in step 306) is multiplied by 60% in step 308.

In step 310, processing and control block 120 applies the FFC values determined by steps 212 to 220 of FIG. 2 (e.g., determined for optical path 140 with shutter 110 inserted into optical path 150) to infrared detectors of FPA 104 to provide thermal image data that accounts for non-uniformities in optical path 140.

In step 312, processing and control block 120 also applies the scaled supplemental FFC values determined in step 308 to the thermal image data to account for non-uniformities in optical path 160. As a result, processing and control block 120 provides corrected thermal image data in step 314 which has been processed to account for non-uniformities along the full optical path 150 (e.g., corresponding to optical paths 140 and 160 together). Thus, by using supplemental FFC values determined for particular configurations of infrared camera 100, non-uniformities attributable to such configurations may be corrected.

Figure 4:
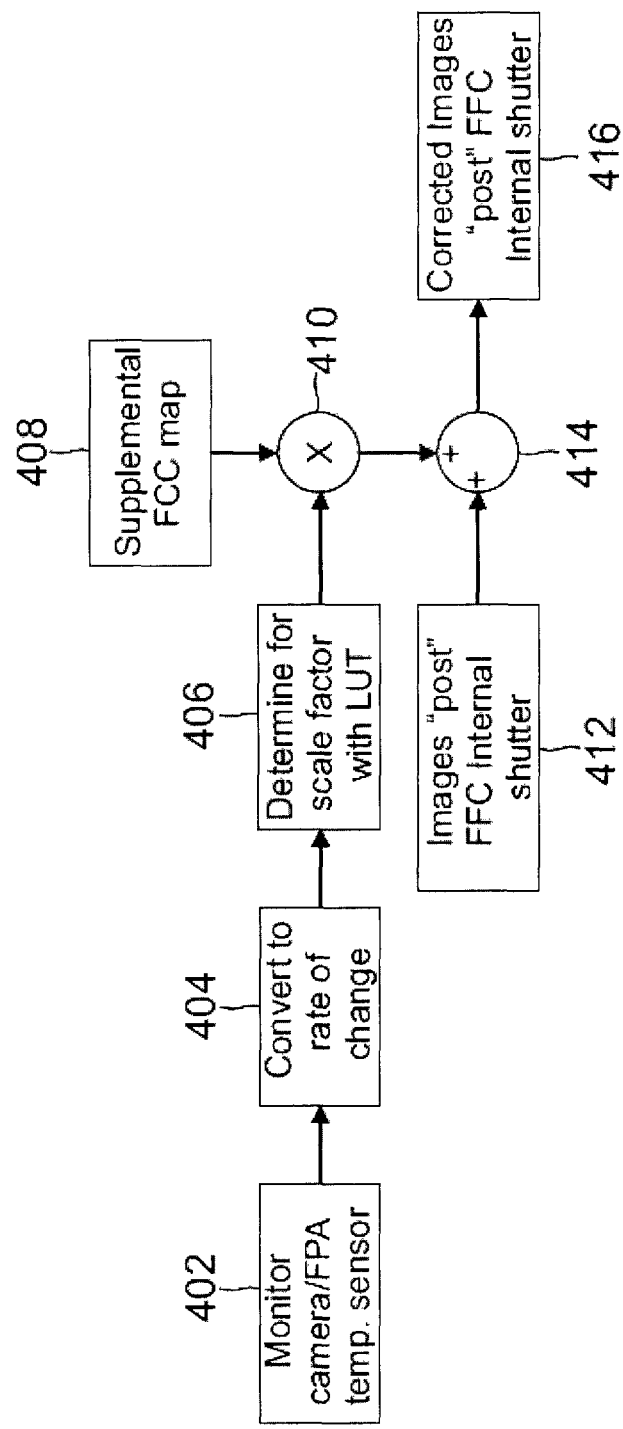
FIG. 4 illustrates a process of performing flat field correction in accordance with an embodiment of the present disclosure.

FIG. 4 illustrates another process of performing flat field correction in accordance with an embodiment of the present disclosure. For example, in one embodiment, the process of FIG. 4 may be performed by processing and control block 120 following the process of FIG. 2.

In step 402, processing and control block 120 monitors temperature sensor(s) 128 and obtains temperature data for the components of infrared camera 100 and/or the ambient environment in which infrared camera 100 is positioned. In step 404, processing and control block 120 processes the temperature data to determine a rate of temperature change. For example, in one embodiment, the rate of temperature change may be integrated over a five second period of time to smooth out high frequency noise.

In step 406, processing and control block 120 determines a scale factor associated with the rate of temperature change determined in step 404. The scale factors may be used to adjust the amount of supplemental FFC applied to thermal image data in real time during operation of infrared camera 100. For example, the following Table 1 identifies various scale factors which may be applied to the supplemental FFC values for different rates of temperature change:

TABLE 1

| Scale factor applied to supplemental flat field correction values | Temperature rate of change in degrees Celsius tor five second period |
|---|---|
| 0.00 | 29 < temperature rate of change |
| 0.25 | 23 < temperature rate of change ≤ 29 |
| 0.50 | 15 < temperature rate of change ≤ 23 |
| 0.75 | 5 < temperature rate of change ≤ 15 |
| 1.00 | temperature rate of change ≤ 5 |

In step 408, appropriate supplemental FFC values are provided from memory 124. In one embodiment, the supplemental FFC values provided in step 408 are selected from a plurality of different sets of supplemental FFC values corresponding to different configurations of infrared camera 100. For example, as previously described, the process of FIG. 2 may be repeated for different infrared cameras 100 or different configurations of infrared camera 100 to store different sets of supplemental FFC values corresponding to various configurations of optics block 116, mounting hardware, and/or other components of infrared camera 100. Accordingly, in step 408, the supplemental FFC values corresponding to the current infrared camera 100 or current configuration of infrared camera 100 are selected.

In step 410, the supplemental FFC values (e.g., provided from memory 124 in step 408) are scaled (e.g., multiplied) by the scale factor determined in step 406. For example, as shown in Table 1, if the temperature rate of change is relatively stable (e.g., changing between zero and five degrees within a five second period), then a scale factor of 1.0 will be determined in step 406 and applied in step 410.

In contrast, if the temperature rate of change is relatively unstable (e.g., changing more than 29 degrees within a five second period), then a scale factor of zero will be determined in step 406 and applied in step 410. In this case, the supplemental FFC values will not be applied to thermal image data.

Other scale factors (e.g., 0.25, 0.50, or 0.75) may be determined and applied for other temperature rates of change as set forth in Table 1. Moreover, although particular scale factors and temperature rates of change are identified in Table 1, other scale factors and temperature rates of change are contemplated. In particular, the scale factors and temperature rates of change identified in Table 1 are dependent on the particular optical path 150 of infrared camera 100 and the desired amount of supplemental FFC that may be desired in particular applications. For example, in another embodiment, scale factors having increments of 0.1 may be used.

In step 412, processing and control block 120 applies the flat field correction values determined by steps 212 to 220 of FIG. 2 (e.g., determined for optical path 140 with shutter 110 inserted into optical path 150) to infrared detectors of FPA 104 to provide thermal image data that accounts for non-uniformities in optical path 140.

In step 414, processing and control block 120 also applies the scaled supplemental FFC values determined in step 410 to the thermal image data to account for non-uniformities in optical path 160. As a result, processing and control block 120 provides corrected thermal image data in step 416 which has been processed to account for non-uniformities along the full optical path 150 (e.g., corresponding to optical paths 140 and 160 together). Thus, by using supplemental FFC values determined for particular configurations of infrared camera 100, non-uniformities attributable to such configurations may be corrected.

Although only a single set of supplemental FFC values are identified in FIGS. 3 and 4, it is contemplated that different sets of supplemental FFC values may be used depending on the particular infrared camera 100 used, the configuration of infrared camera 100, and/or detected temperatures or rates of temperature change. For example, in one embodiment, processing and control block 120 may be configured to extrapolate a single set of supplemental FFC values depending on detected temperatures or rates of temperature changes. In another embodiment, processing and control block 120 may be configured to select different sets of supplemental FFC values, or extrapolate between such values, depending on detected temperatures or rates of temperature changes. In yet another embodiment, such selections or extrapolations may be performed based on the particular infrared camera 100 used or the configuration of infrared camera 100.

Advantageously, the supplemental FFC values as described herein can be applied to thermal image data captured by FPA 104 to compensate for non-uniformities that may otherwise remain uncorrected by conventional shutter-based infrared detector calibrations. Such non-uniformities include, for example, image artifacts of infrared detectors of FPA 104 (e.g., imperfections in detector elements), image artifacts of window 105 (e.g., scratches and/or digs), and non-uniformities in the thermal black body provided by shutter 110 (e.g., caused by non-uniform internal heating).

Also, the use of supplemental FFC values can provide more accurate thermal image data which consequently reduces the frequency at which FPA 104 is recalibrated to the thermal black body provided by shutter 110. As a result, shutter 110 and motor 108 may be used less frequently which may improve their reliability.

In one embodiment, the use of supplemental FFC values may be selectively enabled or disabled as may be desired in particular applications. For example, a user may selectively enable or disable the use of supplemental FFC depending upon whether the most recent FFC was performed using the internal shutter or using an external blackbody source. In one embodiment, a user may selectively enable or disable the use of supplemental FFC values in real time by interacting with a graphic user interface provided by infrared camera 100. In another example, a provider of infrared camera 100 may specify default conditions to enable or disable the use of supplemental FFC values depending upon whether it is expected to utilize an internal shutter or an external blackbody source for FFC.

As noted above in connection with steps 224 and 226 of FIG. 2, other techniques may be used to smooth or otherwise reduce the differences between individual pixel values of a set of supplemental FFC values. In some embodiments, step 224 may be implemented as a median low-pass filter having a variety of different window sizes and/or patterns. For example, in one embodiment, step 224 may be implemented as a two-dimensional "cross" median low-pass filter (e.g., with a "cross" window pattern) of varying window size.

As another example, step 224 may be implemented as an edge-aware low-pass filter, as will be understood by those skilled in the art. In this example, the edge-aware low-pass filter may be used when calibrating a supplemental FFC map so that small imperfections can be corrected without injecting random high-frequency noise. For example, in some cases, the high-frequency noise may be noise due to taking a difference between FFC values associated with optical path 140 and FFC values associated with optical path 150 in order to obtain supplemental FFC values associated with optical path 160. The edge-aware low-pass filter may be applied to smooth an associated supplemental FFC map to remove such high-frequency noise.

In some cases, the imperfections may be caused by coating defects or debris on wafer-level packaged sensors. For example, in some cases involving wafer-level vacuum packaging, a lid may be close to an FPA, with any defects of the lid having good focus as a result of the proximity. Such defects are generally non-uniformities that may span several pixels of the FPA in diameter. In such cases, the edge-aware low-pass filter may be used to perform low-pass filtering on the supplemental FCC map without blurring over edges (e.g., high frequency components) of the defects, such that the supplemental FFC map includes the defects without the defects having been significantly smoothed over. In this manner, since the defects remain detectable in the supplemental FFC map, the defects may then be removed using techniques known to one skilled in the art. An example of such defects is described with respect to FIG. 9.

In other embodiments, where step 224 is applied multiple times through use of step 226, for example, step 224 may be implemented as a three-dimensional "cross", "box", or other window pattern median low-pass filter of varying window size. In such embodiments, a maximum window size in a third dimension may approximate the number of passes performed according to step 226, for example. In further embodiments, step 224 may be implemented as a variety of smoothing filters (e.g., N×N kernel smoothing filters, median low-pass filters, and/or other smoothing filters) that are applied sequentially as the number of passes increments.

As noted above in connection with step 230, step 230 may be adapted to scale supplemental FFC values to higher bit resolutions (e.g., higher than 8-bit resolutions) in preparation for storage, for example. In some embodiments, where the flat field correction values may have a 14-bit resolution, for example, step 230 may be adapted to scale corresponding supplemental FFC values to a 14-bit or higher resolution, for example, and using a complementary or non-complementary bit structure.

Figure 5:
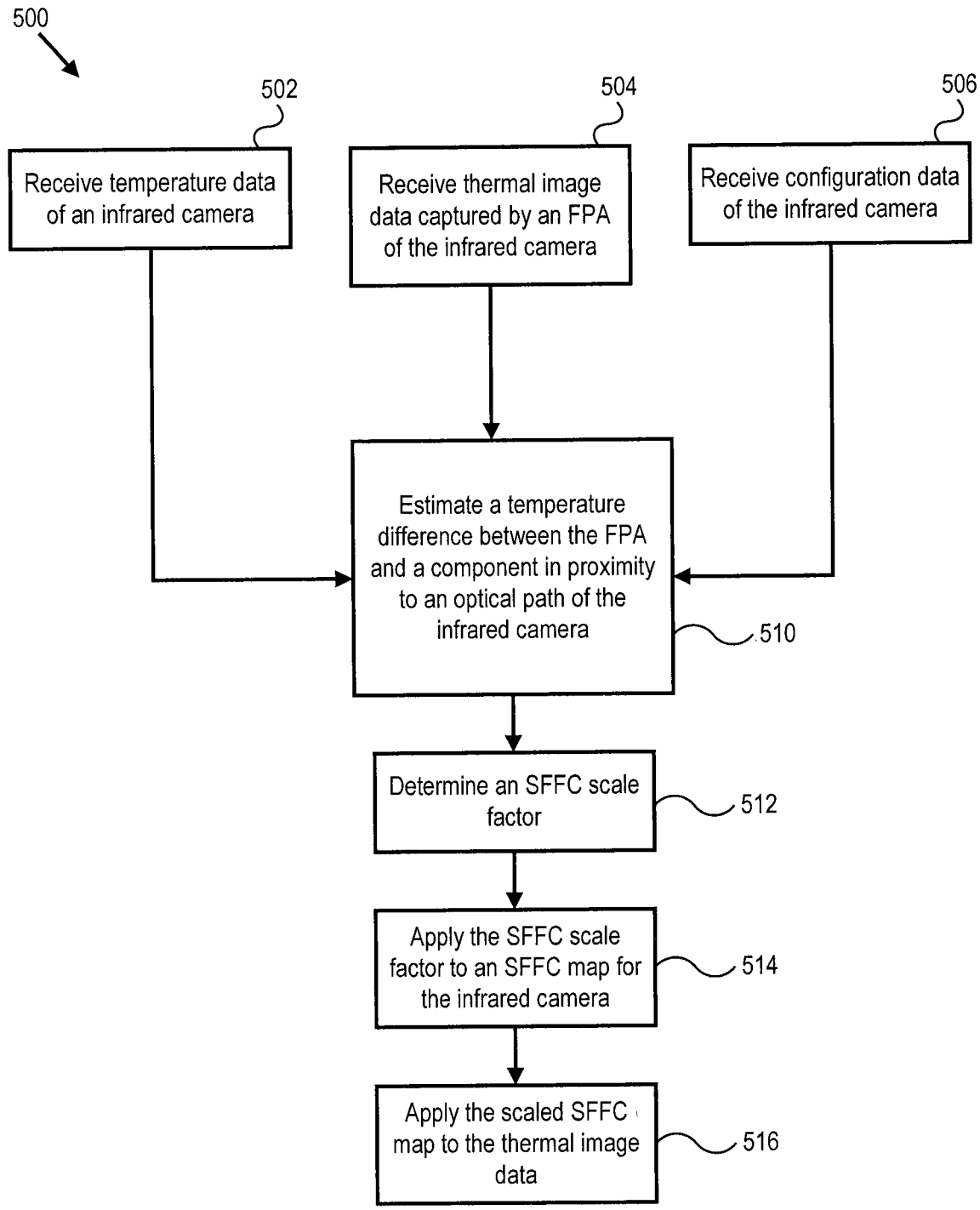
FIG. 5 illustrates a process of performing flat field correction in accordance with an embodiment of the present disclosure.

FIG. 5 illustrates a process 500 of performing FFC in accordance with an embodiment of the present disclosure. For example, in one embodiment, the process of FIG. 5 may be performed by processing and control block 120 following the process of FIG. 2, for example, or following performance of a subset of the process of FIG. 2. In some embodiments, processing and control block 120 may be configured to store outputs of a step and/or block to memory 124 during and/or after processing of the step and/or block.

It should be appreciated that any step, sub-step, sub-process, or block of process 500 may be performed in an order or arrangement different from the embodiment illustrated by FIG. 5. For example, although process 500 includes blocks 502, 504, and 506, in other embodiments, only one or two of blocks 502, 504, and 506 may be present. In various embodiments, process 500 may include various aspects of the process of FIG. 2, the process of FIG. 3, and/or the process of FIG. 4.

For example, in some embodiments, steps 212-220 of the process of FIG. 2 may not be performed. In such embodiments, FFC values associated with path 140 may all be set to the same value, such as zero, for example, such that the supplemental FFC values obtained through step 222 are substantially equal to the FFC values associated with optical path 150. Furthermore, as noted previously, the process of FIG. 2 may be repeated for different temperatures of the surrounding ambient environment and/or components of infrared camera 100, and so different supplemental FFC values (e.g., substantially equal to the FFC values associated with optical path 150), may be determined for a variety of different temperatures. In some embodiments, a configuration of infrared camera 100 may be adjusted iteratively (e.g., through a series of configurations and/or over a pre-determined period of time and/or temperatures), and one or more calibration processes, temperature sensor reading processes, temperature difference estimation processes, supplemental FFC value determining processes, and/or storage processes (e.g., of supplemental FFC values, temperatures, and/or temperature differences to memory 124) may be performed, for example.

In optional block 502, processing and control block 120 receives temperature data of infrared camera 100. For example, processing and control block 120 may be adapted to monitor temperature sensor(s) 128 and receive temperature data for one or more components of infrared camera 100 and/or the ambient environment in which infrared camera 100 is positioned. In some embodiments, processing and control block 120 may be adapted to recognize inaccurate temperature data of a component resulting from, for example, an inoperative or malfunctioning temperature sensor(s) 128. In such embodiments, processing and control block 120 may be adapted to store configuration data in memory 124 indicating the inaccurate temperature data for the particular component.

In optional block 504, processing and control block 120 receives thermal image data of infrared camera 100. For example, processing and control block 120 may be adapted to monitor FPA 104 and receive thermal image data captured by FPA 104. In some embodiments, the thermal image data received by processing and control block 120 may be thermal image data at least partially corrected by flat field correction values associated with, for example, optical path 140 and/or one or more of steps 212 through 220 of the process of FIG. 2. In other embodiments, the thermal image data received by processing and control block 120 may be raw and/or uncorrected thermal image data.

In optional block 506, processing and control block 120 receives configuration data of infrared camera 100. For example, processing and control block 120 may be adapted to monitor one or more components of infrared camera 100, including memory 124, and receive configuration data corresponding to a current and/or past state of one or more of the components of infrared camera 100. For example, in embodiments where window 170 is implemented as a heated or temperature controlled protective window (e.g., with one or more heaters powered by power block 114), processing and control block 120 may be adapted to monitor a power supplied to heated window 170 over time, store such configuration data to memory 124, and/or receive such configuration data (e.g., from power block 114, memory 124, and/or window 170). In like manner, processing and control block 120 may be adapted to monitor and receive configuration data corresponding to a variety of configurations of infrared camera 100, such as power levels of various heaters (e.g., de-icing heaters) coupled to one or more components (e.g., window 105, optics block 116, window 170) of infrared camera 100, selection and/or activation of a particular lens or other optical elements of optics block 115, activation times and/or activation durations of shutter 110 by motor 108, and/or other configurations and/or configuration data of infrared camera 100.

In block 510, processing and control block 120 estimates a temperature difference between FPA 104 and at least one component in proximity to an optical path of infrared camera 100. For example, processing and control block 120 may be adapted to estimate a temperature difference between FPA 104 and any of the components in proximity to optical path 150, such as window 105, shutter 110, optics block 116, window 170, and/or other components of infrared camera 100, including housings for any of FPA 104, window 105, shutter 110, optics block 116, and/or window 170.

In one embodiment, processing and control block 120 may be adapted to determine the estimated temperature difference based on temperature data received in block 502. For example, temperature sensor(s) 128 may be adapted to measure a temperature of a housing of shutter 110 and infrared detector package 106. In such embodiment, processing and control block 120 may be adapted to determine an estimated temperature difference between shutter 110 and FPA 104 by taking the difference between the measured temperatures of the housing of shutter 110 and of infrared detector package 106.

In embodiments where temperature sensor(s) 128 is in thermal equilibrium with FPA 104 and a component of infrared camera 100, the estimated temperature difference may be substantially equal to the actual temperature difference. In embodiments where temperature sensor(s) 128 is not in thermal equilibrium with FPA 104 and a component of infrared camera 100, the estimated temperature difference may be different from the actual temperature difference, for example, and/or may be determined from the measured temperature difference according to known thermal conductivities of components of infrared camera 100 and/or other temperatures measured by temperature sensor(s) 128. Furthermore, the estimated temperature difference may be determined, adjusted, and/or refined from the measured temperature difference according to received image data and/or configuration data, as described herein.

In another embodiment, processing and control block 120 may be adapted to determine the estimated temperature difference based on available temperature data for FPA 104 or a component of infrared camera 100 (e.g., received in block 502), thermal image data received in block 504, and/or configuration data received in block 506. For example, temperature sensor(s) 128 may be malfunctioning or otherwise configured such that only temperature data for FPA 104 or another component of infrared camera 100 is available. In such embodiments, processing and control block 120 may be adapted to use received thermal image data and/or configuration data to predict, estimate, or otherwise determine the unavailable temperature data and/or an estimated temperature difference.

For example, during a calibration of infrared camera 100, temperature data for components of infrared camera 100 may be measured over time from initialization (e.g., from startup) through an approximate thermal equilibrium time, and stored as configuration data in memory 124. Processing and control block 120 may be adapted to determine unavailable temperature data and/or an estimated temperature difference by comparing the time since infrared camera 100 was last initialized to the corresponding configuration data (e.g., a previously determined initialization-thermal equilibrium curve, which may be received in block 506), for example.

In other embodiments, a variety of sets of FFC values associated with optical path 140 and/or 150 may be determined as a function of temperature data for FPA 104 and/or one or more other components of infrared camera 100, and those sets of correction values and corresponding temperature data may be stored as configuration data in memory 124 (e.g., during a calibration of infrared camera 100). Processing and control block 120 may be adapted to determine unavailable temperature data and/or an estimated temperature difference by comparing available temperature data and/or received thermal image data (e.g., corresponding to optical paths 140 and/or 150, which may be received in block 504) to the corresponding configuration data (e.g., previously determined sets of FFC values associated with optical path 140 and/or 150, and/or temperature data for infrared camera 100), for example. In one embodiment, processing and control block 120 may be adapted to select one or more sets of FFC values (e.g., and corresponding temperature data) substantially approximating a pattern of non-uniformities present in the received thermal image data. Processing and control block 120 may be adapted to perform one or more pattern recognition and/or matching processes to select the one or more sets of FFC values.

In a further embodiment, temperature data for FPA 104 and/or one or more other components of infrared camera 100 may be determined as a function of a configuration of infrared camera 100, and be stored as configuration data in memory 124 (e.g., during a calibration of infrared camera 100). For example, temperature data for FPA 104 and/or one or more other components of infrared camera 100 may be measured, calculated, and/or estimated as a function of heater power and/or duration (e.g., transient and/or steady state), activation time and/or activation duration of shutter 110 by motor 108, selection of a particular lens or other optical element of optics block 116, and/or other configurations of infrared camera 100. Processing and control block 120 may be adapted to determine unavailable temperature data and/or an estimated temperature difference by comparing available temperature data and/or present configuration data (e.g., received in block 506) to corresponding stored configuration data (e.g., a previously determined table and/or time-plot of temperatures as a function of configuration of infrared camera 100, which may also be received in block 506), for example.

In embodiments where shutter 110 is implemented as a plastic shutter, out-of-field infrared radiation may primarily come from a housing of shutter 110 and not from optics block 116. Thus, temperature data from FPA 104 and optics block 116 may be insufficient to accurately characterize non-uniformities due to out-of-field infrared radiation. This circumstance may be exacerbated where motor 108 of shutter 110 is implemented as a relatively high-power solenoid, which can generate more heat and dissipate heat more slowly than, for example, a direct-current motor, particularly when activated multiple times within a relatively short period of time. Thus, in some embodiments, configuration data including information of activation time and/or activation duration of shutter 110 by motor 108 can be used to substantially increase the accuracy of determined temperature data and/or an estimated temperature difference. The increased accuracy of the temperature data and/or temperature difference increases the accuracy of the resulting scaled supplemental FFC values, as described herein.

In various embodiments, where temperature data is available for both FPA 104 and one or more components of infrared camera 100, processing and control block 120 may be adapted to adjust and/or refine an estimated temperature difference (e.g., derived from the available temperature data) through use of received thermal image data and/or configuration data, using any of the processes described herein. In further embodiments, where no temperature data is available for either FPA 104 or one or more of the components of infrared camera 100, processing and control block 120 may be adapted to determine unavailable temperature data and/or an estimated temperature difference entirely from thermal image data received in block 504 and/or configuration data received in block 506, as described herein. According to some embodiments, processing and control block 120 may be adapted to determine unavailable temperature data and/or an estimated temperature difference through interpolation and/or extrapolation of infrared image data and/or configuration data.

In block 512, processing and control block 120 determines a supplemental FFC scale factor. For example, processing and control block 120 may be adapted to determine a scale factor from the estimated temperature difference determined in block 510. Similar to step 304 of the process of FIG. 3 and step 406 of the process of FIG. 4, the scale factor may be used to adjust the amount of supplemental FFC applied to thermal image data in real time during operation of infrared camera 100. In some embodiments, such as in step 406, various scale factors (e.g., values of scale factors and/or forms of scale factors) may be identified by one or more tables, similar to Table 1, but where the scale factors are referenced to, for example, ranges of temperature differences (e.g., between FPA 104 and a component of infrared camera 100) and/or temperature differences between specific components of infrared camera 100. Such tables may be stored as configuration data in memory 124, for example.

In other embodiments, a scale factor may be calculated from the estimated temperature difference according to a function $F(\Delta T)$ of the estimated temperature difference $\Delta T$, where $F(\Delta T)$ may be implemented as a polynomial of finite degree N and with N coefficients. In some embodiments, one or more of the N coefficients of $F(\Delta T)$ may be determined as part of a calibration process, such as one or more iterations of at least a subset of steps 202 through 232 of the process of FIG. 2. In one embodiment, the function $F(\Delta T)$ may be implemented as a polynomial of degree 1, where the coefficient for the zero degree is zero (e.g., where $F(\Delta T)=s*\Delta T+0$, for example, and "s" is determined through a calibration process). In a related embodiment, the coefficient "s" may be selected such that $s*\Delta T$ is approximately equal to 1 when $\Delta T$ reaches a steady state value. A steady state value for $\Delta T$ may be an estimated temperature difference determined after infrared camera 100 has been powered for a relatively long period of time (e.g., two minutes, three minutes, ten minutes) in a thermally stable environment, after an estimated temperature difference does not change appreciably over a period of time, or during a calibration process for infrared camera 100, for example, as described herein.

In related embodiments, one or more of the N coefficients of $F(\Delta T)$ may be dependent on a position of a pixel corresponding to a specific supplemental FFC value (e.g., a position of a pixel in a thermal image captured by FPA 104). Thus, in some embodiments, a scale factor may be implemented as a scale factor map including multiplicative and/or additive terms configured to compensate, at least in part, for different temperatures and/or configurations of infrared camera 100. For example, such different temperatures and/or configurations may be related to heating due to activation of shutter motor 108, for instance, and/or activation of a heater of window 105 and/or 170. In addition, regardless of whether the scale factors are retrieved from a table or calculated from a function, the scale factors may vary from negative values to values greater than 1 (e.g., through extrapolation) to compensate, at least in part, for various configurations of infrared camera 100, as described herein.

In further embodiments, a scale factor may be implemented as a function $G(sFFC_{i,j})$ of the supplemental FFC values (e.g., as compared to a simple multiplicative factor), such that application of the scale factor to a supplemental FFC map for infrared camera 100 includes multiplicative and/or additive factors to the individual supplemental FFC values of the set and/or map. For example, $G(sFFC_{i,j})$ (e.g., where $sFFC_{i,j}$ is the supplemental FFC value at a matrix position i, j in a set of supplemental FFC values) may be implemented as a polynomial of finite degree M and with M coefficients.

In some embodiments, one or more of the M coefficients of $G(sFFC_{i,j})$ may be determined as part of a calibration process, such as one or more iterations of at least a subset of steps 202 through 232 of the process of FIG. 2. In one embodiment, the function $G(sFFC_{i,j})$ may be implemented as a polynomial of degree 1, where the coefficients for the first and zero degree terms (e.g., "m" and "b", where $G(sFFC_{i,j})=m*sFFC_{i,j}+b$, for example) are determined through calibration of infrared camera 100 according to various configurations of infrared camera 100, as described herein.

In various embodiments, one or more of the M coefficients of $G(sFFC_{i,j})$ may individually be implemented as functions of the estimated temperature difference $\Delta T$ (e.g., "$m(\Delta T)$" and/or "$b(\Delta T)$", similar to $F(\Delta T)$, herein), where coefficients of the functions may be determined through one or more calibrations of infrared camera 100. Furthermore, one or more of the M coefficients of $G(sFFC_{i,j})$ may be dependent on a position of a pixel corresponding to a specific supplemental FFC value (e.g., a matrix position i, j in a set of supplemental FFC values). Thus, in some embodiments, a scale factor may be implemented as a scale factor map of functions (e.g., embodiments of $G(sFFC_{i,j})$, with coefficients dependent on $\Delta T$, for example) including multiplicative and/or additive terms configured to compensate, at least in part, for different temperatures and/or configurations of infrared camera 100, as described herein.

In block 514, processing and control block 120 applies a supplemental FFC scale factor to a supplemental FFC map for infrared camera 100. For example, processing and control block 120 may be adapted to apply a scale factor, determined according to block 512, to a set of supplemental FFC values for infrared camera 100.

Similar to step 306 of the process of FIG. 3 or step 408 of the process of FIG. 4, appropriate supplemental FFC values may be retrieved and/or provided from memory 124.

In one embodiment, the set of supplemental FFC values may be selected from a plurality of different sets of supplemental FFC values corresponding to different configurations of infrared camera 100. For example, as previously described, the process of FIG. 2 may be repeated for different infrared cameras 100 or different configurations of infrared camera 100 to store different sets of supplemental FFC values corresponding to various configurations of optics block 116, mounting hardware, and/or other components of infrared camera 100. Furthermore, as previously described, the process of FIG. 2 may be repeated for different temperatures of infrared camera 100 and/or components of infrared camera 100 to store different sets of supplemental FFC values corresponding to various temperatures of one or more components of infrared camera 100. Accordingly, in block 514, the set of supplemental FFC values corresponding to the current infrared camera 100, current configuration of infrared camera 100, and/or one or more temperatures of infrared camera 100, may be selected.

In embodiments where the scale factor is implemented as a value and/or map of values, application of the scale factor may include, for example, multiplying the value or values by the corresponding supplemental FFC value or set of values, resulting in a scaled set of supplemental FFC values. In embodiments where the scale factor is implemented as a function or map of functions, application of the scale factor may include, for example, calculating a scaled set of supplemental FFC values from one or more functions of corresponding supplemental FFC values or set of values and/or individual matrix and/or pixel positions, as described herein.

In block 516, processing and control block 120 applies a scaled supplemental FFC map to thermal image data for infrared camera 100. For example, similar to step 312 of the process of FIG. 3 or step 414 of the process of FIG. 4, processing and control block 120 may be adapted to apply a scaled set of supplemental FFC values determined in block 514 to thermal image data received in block 504, for example, to account for non-uniformities in at least a portion of optical path 150 (e.g., optical path 160).

In some embodiments, the thermal image data may be at least partially corrected by FFC values associated with, for example, optical path 140 and/or one or more of steps 212 through 220 of the process of FIG. 2. In other embodiments, the thermal image data may be raw and/or uncorrected thermal image data.

As a result of block 516, processing and control block 120 provides corrected thermal image data which has been processed to account for non-uniformities along at least a portion of optical path 150. When using set of supplemental FFC values determined for particular configurations of infrared camera 100, non-uniformities attributable to such configurations may be corrected.

Figure 6:
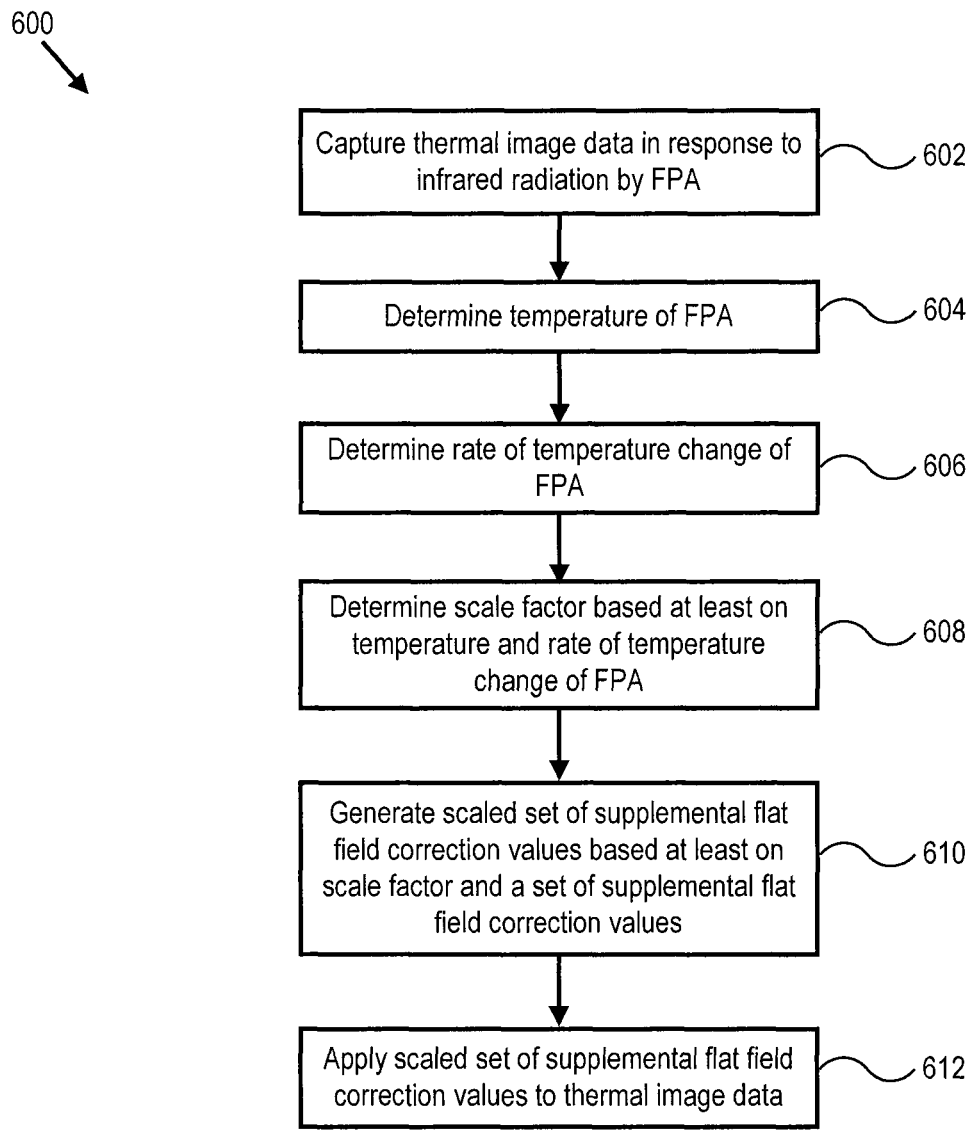
FIG. 6 illustrates a process of performing flat field correction in accordance with an embodiment of the invention.

FIG. 6 illustrates a process 600 of performing FFC in accordance with an embodiment of the present disclosure. For example, in one embodiment, the process of FIG. 5 may be performed by processing and control block 120 following the process of FIG. 2, for example, or following performance of a subset of the process of FIG. 2. In some embodiments, processing and control block 120 may be configured to store outputs of a step and/or block to memory 124 during and/or after processing of the step and/or block.

It should be appreciated that any step, sub-step, sub-process, or block of process 600 may be performed in an order or arrangement different from the embodiment illustrated by FIG. 6. In various embodiments, process 600 may include various aspects of the process of FIG. 2, the process of FIG. 3, the process of FIG. 4, and/or the process of FIG. 5.

For example, in some embodiments, steps 212-220 of the process of FIG. 2 may not be performed. In such embodiments, FFC values associated with path 140 may all be set to the same value, such as zero, for example, such that the supplemental FFC values obtained through step 222 are substantially equal to the FFC values associated with optical path 150. Furthermore, as noted previously, the process of FIG. 2 may be repeated for different temperatures of the surrounding ambient environment and/or components of infrared camera 100, and so different supplemental FFC values (e.g., substantially equal to the FFC values associated with optical path 150), may be determined for a variety of different temperatures. In some embodiments, a configuration of infrared camera 100 may be adjusted iteratively (e.g., through a series of configurations and/or over a pre-determined period of time and/or temperatures), and one or more calibration processes, temperature sensor reading processes, temperature difference estimation processes, supplemental FFC value determining processes, and/or storage processes (e.g., of supplemental FFC values, temperatures, and/or temperature differences to memory 124) may be performed, for example.

In block 602, FPA 104 captures thermal image data in response to infrared radiation received by FPA 104. In this regard, to reach FPA 104, the infrared radiation may propagate through an optical path (e.g., optical path 150) of infrared camera 100 to be received by FPA 104. In some cases, FPA 104 and/or circuitry coupled to FPA 104 may convert the infrared radiation into electrical signals (e.g., voltages, currents, etc.) and generate pixel values based on the electrical signals. The pixel values form the thermal radiation data. In an aspect, the pixel values generated by FPA 104 and/or associated circuitry may be represented in terms of digital count values generated based on the electrical signals obtained from converting the detected infrared radiation. For example, in a case that FPA 104 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383.

In block 604, processing and control block 120 determines a temperature of FPA 104. In block 606, processing and control block 120 determines a rate of temperature change over time of FPA 104. For example, processing and control block 120 may determine the temperature and rate of temperature change of FPA 104 based on temperature data of infrared camera 100 received from temperature sensor(s) 128. In this regard, processing and control block 120 may determine the temperature and/or rate of temperature change of FPA 104 by extracting such information directly from the temperature data and/or deriving such information based on the temperature data.

For example, processing and control block 120 may be adapted to monitor temperature sensor(s) 128 and receive temperature data for one or more components of infrared camera 100 (e.g., such as FPA 104) and/or the ambient environment in which infrared camera 100 is positioned. In some embodiments, processing and control block 120 may be adapted to recognize inaccurate temperature data of a component resulting from, for example, an inoperative or malfunctioning temperature sensor(s) 128. In such embodiments, processing and control block 120 may be adapted to store configuration data in memory 124 indicating the inaccurate temperature data for the particular component.

In block 608, processing and control block 120 determines a scale factor based at least on the temperature and the rate of temperature change of FPA 104. The scale factor scale may be provided as scale=f($\Delta$TFPA)g(TFPA), where TFPA is the temperature of FPA 104 at an instance in time and $\Delta$TFPA is the rate of temperature change (e.g., provided in units of K/min) of FPA 104 at the instance in time. The f($\Delta$TFPA) and g(TFPA) may be computed in real time (e.g., around the time that thermal image data is captured in block 602). Equations f(•) and g(•) may be determined based on empirical data obtained by capturing thermal image data using FPA 104, and may be dependent on optical components (e.g., lenses, optics 116, and/or other components) along an optical path (e.g., optical path 160) of infrared camera 100. For example, lenses of different sizes and/or materials, and/or other optical components, may be associated with (e.g., characterized by) a different f(•) and g(•). In this regard, scale may be more generally provided by scale=$f_{component1}(\Delta T_{component1})g_{component1}(T_{component1})+ \ldots +f_{componentN}(\Delta T_{componentN})g_{componentN}(T_{componentN})$, where component 1 and component N are components of infrared camera 100 (e.g., FPA 104, lens, lens shutter, etc.) In some cases, the scale factor scale may be independent of a rate of temperature change of an ith component such that $f_{component\_i}(\Delta T_{component\_i})=1$ for all $\Delta T_{component\_i}$. The $\Delta T_{component}$ and $T_{component}$ for each component may be, and/or may be derived from, temperature readings from one or more temperature sensor(s) 128. Different temperature sensor(s) 128 may be utilized to provide temperature readings for different components. The equations allow for greater precision in determining the scale factor scale for a current operating condition and may prevent large changes in an applied correction that may occur when a value for the scale factor is selected from a set of discretized values.

In an aspect, lower scaling (e.g., lower f($\Delta$TFPA)) may be applied to the supplemental FFC values at higher rates of temperature change and scaling of around 1 may be applied at lower rates of temperature change, such as when infrared camera 100 reaches its associated steady state temperature(s). In this regard, at turn-on time (e.g., after infrared camera 100 has been off for a period of time), components of infrared camera 100 may be assumed to be at the same temperature, and consequently non-uniformities present in optical path 150 are minimal. In a period of time after turn-on time, the various components of infrared camera 100 generally exhibits self-heating, such that temperature range of change of the components may be high. f($\Delta$TFPA) may be set to less than 1 (e.g., less than 100%) to allow correction values provided during this period of time to be decreased. As respective steady state temperatures of various components are reached, scaling provided by $\Delta$TFPA may steadily increase toward 1 (e.g., also referred to as 100%) as temperature rate of change decreases. Once steady state is reached, $\Delta$TFPA is low (e.g., generally around 0) and f($\Delta$TFPA) may be around 1.

f($\Delta$TFPA) may take into consideration power toggles, in which infrared camera 100 may be turned off (e.g., inadvertently turned off) and turned back on soon thereafter (e.g., within seconds of being turned off). When steady state temperature(s) associated with infrared camera 100 has been reached prior to a power toggle, $\Delta$TFPA is low before being turned off and also after being turned on. In this case, f($\Delta$TFPA) may remain at around 1 or converge quickly back to 1, thus avoiding any underscaling of the scale factor applied to the supplemental FFC values that may occur if scale factor were to be set to 0 upon being turned off if the elapsed period of time during which power is off is short.

As for g(TFPA), higher temperatures may be associated with higher scale factors (e.g., higher correction) than lower temperatures since self-heating is typically higher at higher temperatures as well as at higher temperature differences of components within the infrared camera 100. g(TFPA) may be utilized to address differences between a temperature at which infrared camera 100 is calibrated for (e.g., temperature at which FFC map and supplemental FFC map are determined) and an actual temperature of infrared camera 100 (e.g., as measured by temperature sensor(s) 128 during operation of infrared camera 100). In this regard, g(TFPA) may help avoid overcorrecting the supplemental FFC values at lower temperatures and avoid undercorrecting the supplemental FFC values at higher temperatures. In some cases, less correction may be applied at lower temperatures since there is less out-of-field irradiance at lower temperatures, and/or more correction may be applied at higher temperatures to account for self-heating of infrared camera 100 that may be exhibited at these higher temperatures.

In an embodiment, equations for f($\Delta$TFPA) and g(TFPA) may be determined during calibration of infrared camera 100 (e.g., at the factory and/or in during operation in the field) by determining scale factors that allow minimization of fixed pattern noise of thermal images captured by infrared camera 100 during calibration. As an example, during calibration, a supplemental FFC map may be determined from a sequence of thermal images captured at room-ambient temperature (e.g., 25° C.). For each point in time after turn-on, a scaling value can be determined that minimizes fixed pattern noise. A temperature and rate of temperature change may be determined for each collected frame as a function of time, such as based on temperature data from temperature sensor(s) 128 (e.g., received as telemetry data in some cases). In an aspect, the optimum scaling factor for each frame may also be determined (e.g., by determining the scaling factor that minimizes non-uniformity). The optimum scaling values and the rate of temperature change may be utilized to determine optimum coefficient values for f($\Delta$TFPA) and g(TFPA).

As an example, f($\Delta$TFPA)=min(max(−0.14$\Delta$TFPA+1.07, 0), 1) and g(TFPA)=0.057TFPA+0.8575. In this example of f($\Delta$TFPA), lower scaling (e.g., lower f($\Delta$TFPA)) is applied to the supplemental FFC values at higher rates of temperature change and scaling of around 1 may be applied at lower rates of temperature change. In this example of g(TFPA), higher temperatures of FPA 104 are associated with higher scale factors (e.g., higher correction) than lower temperatures. This g(TFPA) may help avoid overcorrecting the supplemental FFC values at lower temperatures and avoid undercorrecting the supplemental FFC values at higher temperatures.

At turn-on time, components of infrared camera 100 may be assumed to be at the same temperature. In a period of time after turn-on time, the various components of infrared camera 100 generally exhibits self-heating, such that temperature range of change of the components are high. Using f($\Delta$TFPA)=min(max(−0.14$\Delta$TFPA+1.07, 0), 1), correction values provided during this period of time may be decreased gradually. As respective steady state temperatures of various components are reached, scaling provided by $\Delta$TFPA increases toward 1 (e.g., also referred to as 100%) as temperature rate of change decreases. Once steady state is reached, $\Delta$TFPA is low (e.g., generally around 0) and f($\Delta$TFPA)=min(−max(1.07, 0), 1)=1. Such an equation for f($\Delta$TFPA) also addresses a power toggle. When steady state temperature(s) associated with infrared camera 100 has been reached prior to a power toggle, ΔTFPA is low before being turned off and also after cycling power. In this case, f(ΔTFPA) remains at around 1 or converges quickly back to 1 when a power toggle occurs, thus avoiding any underscaling of the scale factor scale that may occur if scale were to be reset to 0 upon being turned off.

In an embodiment, the scale factor (e.g., computed in block 608) may be further based on a time difference between a current time (e.g., a time around when f(ΔTFPA) and g(TFPA) are being computed) and a most recent turn-on time of infrared camera 100. The use of time difference can be to prevent the scaling factor from reverting to a value less than 100% after steady-state operation has been reached, even if ΔTFPA is a number significantly larger than zero. For example, such a condition might happen if the ambient temperature in which the camera is operated is suddenly changed after steady-state. In such case, ΔTFPA may not be a good variable for estimation of temperature differences of components within infrared camera 100, and it may be preferred to continue to apply steady-state scaling. The most recent turn-on time may be a most recent time at which infrared camera 100 is turned on and power supplied (e.g., by power block 114) to infrared camera 100 to facilitate operation of infrared camera 100. In some cases, any power toggles since the most recent turn-on time may be ignored when determining the time difference between the most recent turn-on time and the current time. In such cases, infrared camera 100 may include or may be communicatively coupled to a clock that remains active during power-off of infrared camera 100. In other cases, a power toggle may cause the time difference between the current time and the most recent turn-on time to reset back to zero when the power toggle occurs. The threshold time difference that is set may be determined based on an amount of time (e.g., an average amount of time) needed for infrared camera 100 and/or components thereof to reach their steady state temperatures after turn-on of infrared camera 100.

In this regard, different components of infrared camera 100 may have different steady state temperatures. As an example, the threshold time difference may be 2.5 minutes, such that after 2.5 minutes f(ΔTFPA)=1, regardless (e.g., independent) of the value of ΔTFPA, and scale=f(ΔTFPA) g(TFPA)=g(TFPA). In this manner, after an initial start-up period, computational resources of infrared camera 100 or component(s) thereof (e.g., processing and control block 120) utilized to compute f(ΔTFPA) may be conserved. In an aspect, f(ΔTFPA) may be utilized to allow for FFC and supplemental FFC correction at start-up of infrared camera 100 without causing false corrections when the entire infrared camera 100 is heated or cooled after infrared camera 100 has already reached steady state.

In block 610, processing and control block 120 generates a scaled set of supplemental FFC values based at least on the scale factor and a set of supplemental FFC values. In an aspect, the set of supplemental FFC values may be obtained as a result of performing some or all of steps 222 through 232. The set of supplemental FFC values may be stored in memory 124 of processing and control block 120 and/or other memory accessible to processing and control block 120. In an aspect, different scale factors and/or different sets of supplemental FFC values may be applied for different possible optical component configurations of infrared camera 100.

In an embodiment, processing and control block 120 may apply an edge-aware low-pass filter (e.g., at step 224) as part of the process for obtaining the set of supplemental FFC values. The edge-aware low-pass filter may be utilized to correct for small imperfections without injecting random high-frequency noise, which may occur due to wafer-level vacuum packaging. Alternatively and/or in addition, processing and control block 120 may apply an edge-aware low-pass filter to a generated set of supplemental FFC values, such as a generated set stored in step 232. An edge-aware low-pass filter may be applied at various other steps of a process for obtaining the set of supplemental FFC values and/or as part of post-processing of an obtained set of supplemental FFC values. In some cases, the scale factor may be applied to a filtered set of supplemental FFC values (e.g., set of supplemental FFC values filtered by one or more edge-aware low pass filters), the scale factor may be applied to a set of supplemental FFC values prior to filtering and then the scaled set of supplemental FFC values is filtered, or combination thereof (e.g., edge-aware low pass filtering is performed before and after the scale factor is applied).

In an embodiment, a temporal dampening term may be applied to supplemental FFC values. The temporal dampening term may be utilized to reduce effect of performing temperature readings periodically (e.g., every few seconds) and inherent error (e.g., which may be considered noise) associated with such readings. In this regard, the temporal dampening term may be utilized to reduce effect of noise associated with changes in the rate of temperature change (e.g., as measured every few seconds) and essentially smooth out noisy measurements associated with the rate of temperature change. A temporal dampening term may be applied to the value of ΔTFPA, to the scale factor, and/or to a scaled set of supplemental FFC values.

In some cases, the temporal dampening term may be implemented as a filter, such as an infinite impulse response (IIR) filter. The temporal dampening term may be based on a linear combination (e.g., weighted average) of a scale factor (e.g., scale as provided in the foregoing description) at a current time $t_{current}$ and one or more scale factors determined at prior times. The temporal dampening term may be utilized to minimize relatively large and/or quick fluctuations associated with applied supplemental FFC values. Different infrared cameras and/or components thereof may be associated with a different temporal dampening term.

In block 612, processing and control block 120 applies the scaled set of supplemental FFC values to the thermal image data to adjust for non-uniformities associated with at least a portion of the optical path. As an example, the portion may be optical path 160 of optical path 150. In an aspect, the scaled set of supplemental FFC values may be or may be referred to as a scaled supplemental FFC map or simply supplemental FFC map. In some cases, edge-aware low pass filtering may have been applied to obtain the scaled set of supplemental FFC values. In some cases, edge-aware low pass filtering and/or application of a temporal dampening term may be applied on the scaled set of supplemental FFC values.

As a result of block 612, processing and control block 120 provides corrected thermal image data which has been processed to account for non-uniformities along at least a portion (e.g., optical path 160) of the optical path (e.g., optical path 150). When using the scaled set of supplemental FFC values determined for particular configurations of infrared camera 100, non-uniformities attributable to such configurations may be corrected.

Although the foregoing is described with respect to applying scale factors to supplemental FFC values based on a temperature and rate of temperature change of FPA 104, the scale factors may be based on a temperature and rate of temperature change of one or more other components of infrared camera 100 alternatively and/or in addition to a temperature and rate of temperature change of FPA 104. For example, a temperature of, a rate of temperature change of, and/or a difference in temperature and/or rate of temperature change between one or more components of infrared camera 100, ambient environment, and/or out-of-field sources may be utilized to determine the scale factors. The component(s) of infrared camera 100 may include internal component(s) of infrared camera 100 such as, by way of non-limiting example, a lens housing (e.g., lens barrel), a lens shutter (e.g., paddle shutter), an element(s) (e.g., lens, mirror, optics block 116), a motor (e.g., motor 108), a power supply (e.g., power block 114), a processor (e.g., processor 122), a memory (e.g., memory 124), and/or other components within infrared camera 100. In some cases, alternatively and/or in addition, the component(s) of infrared camera 100 may include components external to and/or externally coupled to infrared camera 100. In this regard, one or more temperature sensor(s) 128 may provide temperature readings of these various components, environments, and/or sources. The number of temperature sensor(s) 128 and/or placement of temperature sensor(s) 128 may be based on size, weight, and/or spatial considerations (e.g., of infrared camera 100 and/or temperature sensor(s) 128 itself), cost, and so forth.

In some cases, the temperature and rate of temperature change of FPA 104 may be utilized as an indication (e.g., an estimate) of a temperature difference between a lens barrel, a shutter paddle, and/or one or more other components of infrared camera 100. For example, when temperature data of the lens barrel and the shutter paddle are available from temperature sensor(s) 128, such temperature readings may be utilized to directly determine the temperature difference between the lens barrel and the shutter paddle (e.g., in addition to or alternative to temperature data of FPA 104 being used as an indication of the temperature difference between the lens barrel and the shutter paddle). The determined temperature difference between the lens barrel and the shutter paddle may then be utilized to determine the scale factor to be applied for supplemental FFC correction. Examples of FFC and supplemental FFC are provided in U.S. Pat. Nos. 8,373,757 and 9,491,376, both of which are incorporated by reference in their entireties.

Figure 7:
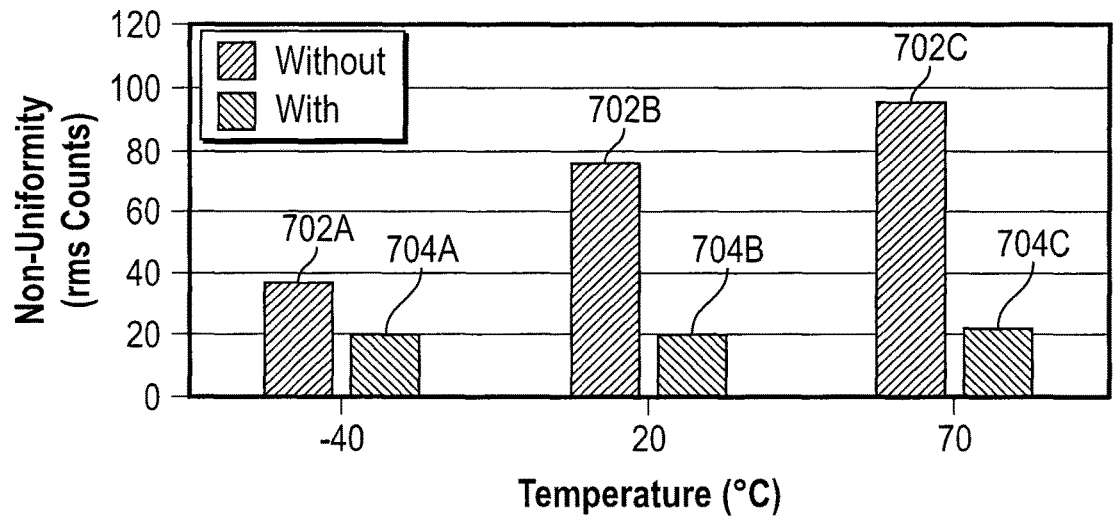
FIG. 7 illustrates a bar graph depicting non-uniformity in corrected thermal image data at steady-state with and without applying supplemental flat field correction values in accordance with an embodiment of the present disclosure.

FIG. 7 illustrates a bar graph depicting non-uniformity in corrected thermal image data at steady-state operation, with and without applying supplemental FFC values in accordance with an embodiment of the present disclosure. In FIG. 7, the supplemental FFC values have been scaled by a scale factor prior to being applied to captured thermal image data. For example, the scaled set of supplemental FFC values may be that provided at block 610 of FIG. 6, and the corrected thermal image data may be that provided at block 612.

Bars 702A, 702B, and 702C provide non-uniformity in the corrected thermal image data in terms of root mean square (rms) digital count values at an ambient temperature of −40° C., 20° C., and 70° C., respectively, in the case without applying supplemental FFC values to obtain the corrected thermal image data (e.g., the corrected thermal image data is corrected without using supplemental FFC values). Bars 704A, 704B, and 704C provide non-uniformity in the corrected thermal image data at an ambient temperature of −40° C., 20° C., and 70° C., respectively, in the case where supplemental FFC values have been applied to the thermal image data to obtain the corrected thermal image data. By comparing bars 702A-C with corresponding bars 704A-C, the applying of supplemental FFC values (e.g., scaled supplemental FFC values) reduces the non-uniformity in the corrected thermal image data by around 50%, around 70%, and around 80% at an ambient temperature of −40° C., 20° C., and 70° C., respectively. In addition, the non-uniformity in the corrected thermal image data remains relatively constant at different ambient temperatures for the case that supplemental FFC values (e.g., scaled supplemental FFC values) are applied.

Figure 8:
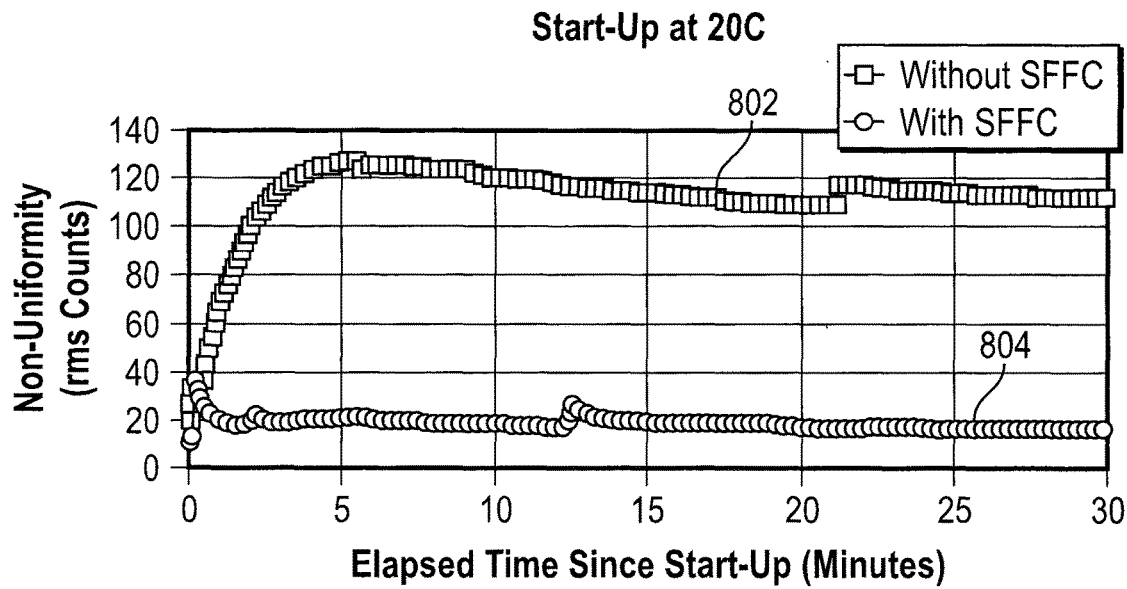
FIG. 8 illustrates a graph depicting non-uniformity in corrected thermal image data versus elapsed time since start-up with and without applying supplemental flat field correction values in accordance with an embodiment of the present disclosure.

FIG. 8 illustrates a graph depicting non-uniformity in corrected thermal image data versus elapsed time since turn-on with and without applying supplemental FFC values in accordance with an embodiment of the present disclosure. In FIG. 8, the supplemental FFC values have been scaled by a scale factor (e.g., at block 610 of FIG. 6) prior to being applied to captured thermal image data. A curve 802 provides non-uniformity in the corrected thermal image data without applying supplemental FFC values to obtain the corrected thermal image data as a function of an elapsed time since start-up. A curve 804 provides non-uniformity in the corrected thermal image data in the case where supplemental FFC values have been applied to the thermal image data to obtain the corrected thermal image data as a function of an elapsed time since start-up. By comparing curves 802 and 804, the applying of supplemental FFC values (e.g., scaled supplemental FFC values) reduce the non-uniformity in the corrected thermal image data at steady-state without adding non-uniformity at start-up or times close to start-up. In addition, the curve 804 remains relatively constant after an initial peak within the first minute after start-up, and remains at a lower non-uniformity count than the curve 802.

Figure 9:
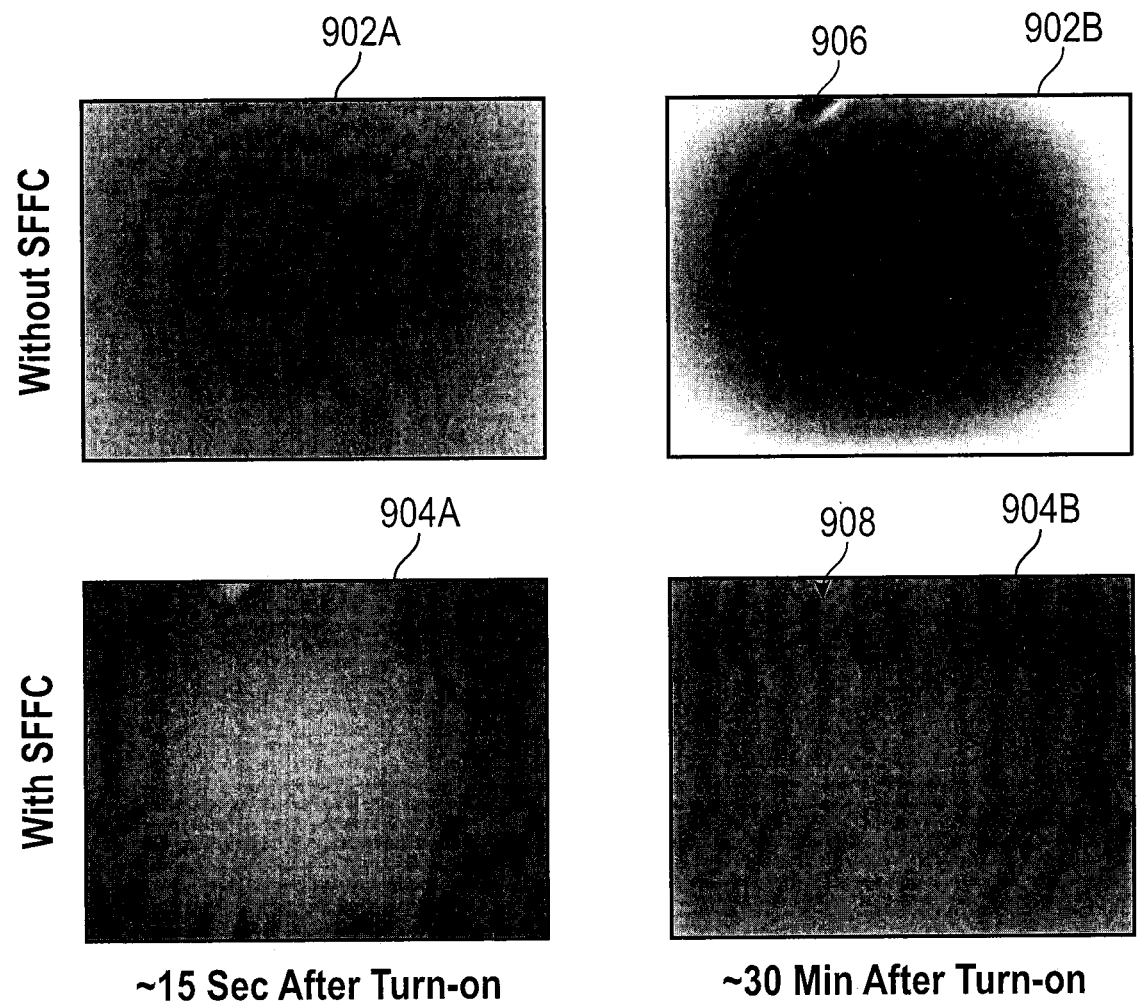
FIG. 9 illustrates corrected thermal image data at two different points in time with and without applying supplemental flat field correction values in accordance with an embodiment of the present disclosure.

FIG. 9 illustrates corrected thermal image data in accordance with an embodiment of the present disclosure. Thermal image data is captured using an infrared camera (e.g., infrared camera 100). A top row illustrates corrected thermal image data 902A and 902B in which no supplemental FFC values and edge-aware low-pass filter are applied to obtain the corrected thermal image data 902A and 902B at around 15 seconds after turn-on of the infrared camera and 30 minutes after turn-on, respectively. A bottom row illustrates corrected thermal image data 904A and 904B in which supplemental FFC values and edge-aware low-pass filter(s) are applied to obtain the corrected thermal image data 902A and 902B at around 15 seconds after turn-on of the infrared camera and 30 minutes after turn-on, respectively. In FIG. 9, the supplemental FFC values have been scaled by a scale factor prior to being applied to captured thermal image data.

The corrected thermal image data 902A-B and 904A-B are captured while the camera is imaging an external thermal black body. At 30 minutes after turn-on, non-uniformity is reduced in the case that scaled supplemental FFC values has been applied, as shown by a more uniform output shown in corrected thermal image data 904B compared to corrected thermal image data 902B (e.g., which has white areas, darker areas, and lighter areas). Furthermore, applying the scaled supplemental FFC values also exhibits reduction of defects. In this regard, defect 906 shown in 902B is much more pronounced than corresponding defect 908 shown in 904B.

As noted herein, it is contemplated that different sets of supplemental FFC values and/or scaling equations (e.g., f(ΔTFPA) and g(TFPA)) may be used depending on the particular infrared camera 100 used, the configuration of infrared camera 100, and/or detected temperatures of infrared camera 100. For example, in one embodiment, processing and control block 120 may be configured to determine a single set of supplemental FFC values depending on detected temperatures of infrared camera 100 that, through use of a scale factor, can account for non-uniformities in at least a portion of optical path 150. In another embodiment, processing and control block 120 may be configured to select different sets of supplemental FFC values, or interpolate between such values, or extrapolate from such values, depending on detected temperatures of infrared camera 100. In yet another embodiment, such selections, interpolations, and/or extrapolations may be performed based on the particular infrared camera 100 used or the configuration of infrared camera 100.

In some embodiments, steps 202 through 210 of the process of FIG. 2 may be performed without an external thermal black body. For example, processing and control block 120 may be adapted to detect when thermal image data received from FPA 104 is blurred through motion, for example, or through de-focusing of one or more optical elements (e.g., a lens) of optics block 116. Such blurred thermal image data may be sufficiently smooth and/or uniform due to the motion and/or focus blurring to allow processing and control block 120 to determine a set of FFC values from the blurred thermal image data.

In other embodiments, infrared camera 100 may be implemented without shutter 110. In such embodiments, processing and control block 120 may be adapted to determine a set of supplemental FFC values through one or more iterations of, for example, steps 202 through 210 of the process of FIG. 2 (e.g., with and/or without an external thermal black body). In some embodiments, processing and control block 120 may be adapted to scale the resulting set of supplemental FFC values, using scale factors determined from one or more estimated temperature differences between FPA 104 and one or more components of infrared camera 100 in proximity to optical path 150, to account for non-uniformities in optical path 150.

Where applicable, the various described embodiments may be implemented using hardware, software, or combinations of hardware and software. Also where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the spirit of the disclosure. In addition, where applicable, it is contemplated that software components may be implemented as hardware components, and vice-versa. In some embodiments, such hardware components (e.g., processing and control block 120) may be implemented as one or more appropriate processors and/or processing devices (e.g., logic device, microcontroller, processor, application specific integrated circuit (ASIC), field programmable gate array (FPGA), or other device) that may be used to execute appropriate instructions, such as software instructions implementing any of the processes described herein.

Software in accordance with the various described embodiments, such as program code and/or data, may be stored on one or more machine readable media. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the present disclosure is defined only by the following claims.

We claim:

1. A system, comprising:
   a focal plane array (FPA) of an infrared camera configured to capture thermal image data in response to infrared radiation received by the FPA via a first optical path of the infrared camera;
   a memory configured to store a set of supplemental flat field correction (SFFC) values; and
   a processor configured to:
      determine a temperature of an internal component of the infrared camera;
      determine a scale factor based at least on the temperature and/or a rate of temperature change of the internal component;
      apply an edge-aware low pass filter to the set of SFFC values to obtain a filtered set of SFFC values;
      generate a scaled set of SFFC values based at least on the scale factor and the filtered set of SFFC values; and
      apply the scaled set of SFFC values to the thermal image data to adjust for non-uniformities associated with at least a portion of the first optical path.

2. The system of claim 1, further comprising one or more temperature sensors, wherein the processor is further configured to:
   receive temperature data associated with the internal component from the one or more temperature sensors; and
   determine the temperature and/or the rate of temperature change of the internal component based at least on the received temperature data, wherein the internal component comprises the FPA, the processor, the memory, a power block, a motor, a shutter, a lens barrel, a lens, a mirror, or a window.

3. The system of claim 1, wherein:
   the processor is further configured to determine a temperature of one or more other internal components of the infrared camera; and
   the processor is configured to determine the scale factor further based on the temperature and/or a rate of temperature change of the one or more other internal components.

4. The system of claim 1, wherein the scale factor is further based on a time difference between a current time and a most recent turn-on time of the infrared camera.

5. The system of claim 1, wherein:
   the processor is further configured to apply a dampening factor to the scale factor to obtain a dampened scale factor, the scaled set of SFFC values being based at least on the dampened scale factor and the filtered set of SFFC values;
   the scale factor is associated with a first-time instance; and
   the dampening factor is based on the determined scale factor and one or more scale factors associated with a time instance earlier than the first-time instance.

6. The system of claim 1, wherein the internal component comprises the FPA, wherein the processor is configured to:
determine a temperature of the FPA;
determine a rate of temperature change of the FPA; and
determine the scale factor based at least on the temperature and the rate of temperature change of the FPA.

7. The system of claim 6, wherein the scale factor is further based on a time difference between a current time and a most recent turn-on time of the infrared camera, and wherein the processor is configured to determine the scale factor independent of the rate of temperature change of the FPA when the time difference is greater than a threshold time difference.

8. The system of claim 1, wherein:
the memory is further configured to store the filtered set of SFFC values.

9. The system of claim 1, further comprising a shutter located between the FPA and a lens and/or optics block of the infrared camera, wherein the processor is configured to:
calibrate the FPA to an external scene to determine a first set of FFC values associated with the first optical path from the external scene to the FPA;
calibrate the FPA to the shutter to determine a second set of FFC values associated with a second optical path from the shutter to the FPA;
use the first and second set of FFC values to determine the set of SFFC values; and
store the set of SFFC values in the memory.

10. The system of claim 1, wherein the memory is configured to store a plurality of sets of SFFC values to adjust for non-uniformities associated with different optical configurations which may be selectively inserted into the first optical path and/or different configurations of the infrared camera.

11. A method, comprising:
capturing thermal image data at a focal plane array (FPA) of an infrared camera via an optical path of the infrared camera;
determining a temperature of an internal component of the infrared camera;
determining a first scale factor based at least on the temperature and/or a rate of temperature change of the internal component;
applying an edge-aware low pass filter to a set of supplemental flat field correction (SFFC) values to obtain a filtered set of SFFC values;
generating a first scaled set of SFFC values based at least on the first scale factor and the filtered set of SFFC values; and
applying the first scaled set of SFFC values to the thermal image data to adjust for non-uniformities associated with at least a portion of the optical path.

12. The method of claim 11, further comprising:
applying a temporal dampening factor to the first scale factor to obtain a temporally-dampened scale factor, the first scaled set of SFFC values being based at least on the temporally-dampened scale factor and the filtered set of SFFC values;
the first scale factor is associated with a first-time instance; and
the temporal dampening factor is based on the determined first scale factor and one or more scale factors associated with a time instance earlier than the first-time instance.

13. The method of claim 11, wherein the first scale factor is further based on a temperature and/or a rate of temperature change associated with one or more other internal components of the infrared camera, wherein the internal component comprises the FPA, and wherein the first scale factor is based at least on the temperature and the rate of temperature change of the FPA.

14. The method of claim 13, wherein the temperature, rate of temperature change, and first scale factor are associated with a first-time instance, and wherein the first scale factor is further based on a time difference between the first-time instance and a most recent turn-on time of the infrared camera.

15. The method of claim 14, further comprising:
determining a second scale factor independent of a rate of temperature change of the FPA, wherein the second scale factor is associated with a second-time instance subsequent to the first-time instance, and wherein a time difference between the second-time instance and the most recent turn-on time is greater than a threshold time difference;
generating a second scaled set of SFFC values based at least on the second scale factor and the second set of SFFC values; and
applying the second scaled set of SFFC values to second thermal image data to adjust for non-uniformities associated with at least a portion of the optical path.

16. A non-transitory machine-readable storage medium including machine-readable instructions which, when executed, cause one or more processors of a device to perform operations comprising:
determining a temperature of an internal component of an infrared camera, wherein the internal component comprises a focal plane array (FPA);
determining a scale factor based at least on the temperature and/or a rate of temperature change of the internal component, wherein the scale factor is based at least on the rate of temperature change of the FPA when a time difference between a current time and a most recent turn-on time of the infrared camera is not greater than a threshold time difference, and wherein the scale factor is independent of the rate of temperature change of the FPA when the time difference is greater than the threshold time difference;
generating a scaled set of supplemental flat field correction (SFFC) values based at least on the scale factor and a set of calibrated SFFC values; and
applying the scaled set of SFFC values to thermal image data captured by the FPA of the infrared camera to adjust for non-uniformities associated with at least a portion of an optical path of the infrared camera.

17. The non-transitory machine-readable storage medium of claim 16, wherein the operations further comprise:
applying a temporal-dampening factor to the scale factor to obtain a dampened scale factor, the scaled set of SFFC values being based at least on the dampened scale factor and the set of calibrated SFFC values;
the scale factor is associated with a first-time instance; and
the temporal-dampening factor is based on the determined scale factor and one or more scale factors associated with a time instance earlier than the first-time instance.

18. A system, comprising:
a focal plane array (FPA) of an infrared camera configured to capture thermal image data in response to infrared radiation received by the FPA via a first optical path of the infrared camera;

a memory configured to store a set of supplemental flat field correction (SFFC) values; and a processor configured to:
- determine a temperature of an internal component of the infrared camera, wherein the internal component comprises the FPA;
- determine a scale factor based at least on the temperature and/or a rate of temperature change of the internal component, wherein the scale factor is based at least on the rate of temperature change of the FPA when a time difference between a current time and a most recent turn-on time of the infrared camera is not greater than a threshold time difference, and wherein the scale factor is independent of the rate of temperature change of the FPA when the time difference is greater than the threshold time difference;
- generate a scaled set of SFFC values based at least on the scale factor and the set of SFFC values; and
- apply the scaled set of SFFC values to the thermal image data to adjust for non-uniformities associated with at least a portion of the first optical path.

19. The system of claim 18, further comprising a shutter located between the FPA and a lens of the infrared camera, wherein the processor is configured to:
- calibrate the FPA to an external scene to determine a first set of FFC values associated with the first optical path from the external scene to the FPA;
- calibrate the FPA to the shutter to determine a second set of FFC values associated with a second optical path from the shutter to the FPA;
- use the first and second set of FFC values to determine the set of SFFC values; and
- store the set of SFFC values in the memory.

20. The system of claim 18, wherein:
- the processor is further configured to determine a temperature of one or more other internal components of the infrared camera; and
- the processor is configured to determine the scale factor further based on the temperature and/or a rate of temperature change of the one or more other internal components.

* * * * *